(12) United States Patent
Bailey

(10) Patent No.: US 9,633,190 B2
(45) Date of Patent: Apr. 25, 2017

(54) SYSTEMS AND METHODS FOR ASSESSING SECURITY RISK

(71) Applicant: Leap Marketing Technologies Inc., Coquitlam (CA)

(72) Inventor: Christopher Everett Bailey, Langley (CA)

(73) Assignee: NuData Security Inc., Vancouver (CA)

( * ) Notice: Subject to any disclaimer, the term of this patent is extended or adjusted under 35 U.S.C. 154(b) by 220 days.

(21) Appl. No.: 14/218,824

(22) Filed: Mar. 18, 2014

(65) Prior Publication Data

US 2014/0317750 A1    Oct. 23, 2014

Related U.S. Application Data

(63) Continuation of application No. 12/935,927, filed as application No. PCT/IB2009/005645 on Mar. 31, 2009.

(Continued)

(51) Int. Cl.
*G06F 3/048* (2013.01)
*G06F 21/36* (2013.01)
(Continued)

(52) U.S. Cl.
CPC ............ *G06F 21/36* (2013.01); *G06Q 30/02* (2013.01); *G06Q 30/0277* (2013.01);
(Continued)

(58) Field of Classification Search
CPC .. G06Q 20/40; G06Q 20/223; G06Q 30/0214; G06Q 20/3674; G06Q 20/3672
See application file for complete search history.

(56) References Cited

U.S. PATENT DOCUMENTS

| 5,774,525 A | 6/1998 | Kanevsky et al. |
| 5,940,751 A | 8/1999 | Kaplan et al. |

(Continued)

FOREIGN PATENT DOCUMENTS

| CA | 2426168 A1 | 5/2002 |
| JP | 2008/052727 A | 3/2008 |

(Continued)

OTHER PUBLICATIONS

Adverlab Blog Spot, "CAPTCHA Advertising, Part II," Jan. 8, 2007. http:/adverlab.blospot.com/2007/01/captcha-advertising-part-ii.html, retrieved on Jul. 24, 2008.

(Continued)

*Primary Examiner* — Jeffrey A Gaffin
*Assistant Examiner* — Ayesha Huertas Torres
(74) *Attorney, Agent, or Firm* — Wolf, Greenfield & Sacks, P.C.

(57) ABSTRACT

Systems and methods for providing identification tests. In some embodiments, a system and a method are provided for generating and serving to a user an animated challenge graphic comprising a challenge character set whose appearance may change over time. In some embodiments, marketing content may be incorporated into a challenge message for use in an identification test. The marketing content may be accompanied by randomly selected content to increase a level of security of the identification test, hi some embodiments, a challenge message for use in an identification test may be provided based on information regarding a transaction for which the identification test is administered. For example, the transaction information may include a user identifier such as an IP address. In some embodiments, identification test results may be tracked and analyzed to identify a pattern of behavior associated with a user identi- (Continued)

fier. A score indicative of a level of trustworthiness may be computed for the user identifier.

21 Claims, 18 Drawing Sheets

Related U.S. Application Data

(60) Provisional application No. 61/050,839, filed on May 6, 2008, provisional application No. 61/041,556, filed on Apr. 1, 2008.

(51) Int. Cl.
G06Q 30/02 (2012.01)
G06T 13/80 (2011.01)
H04L 29/06 (2006.01)

(52) U.S. Cl.
CPC .......... G06T 13/80 (2013.01); H04L 63/0884 (2013.01); H04L 63/1433 (2013.01); G06F 2221/2103 (2013.01)

(56) References Cited

U.S. PATENT DOCUMENTS

| | | | |
|---|---|---|---|
| 7,680,891 B1 | 3/2010 | Pongsajapan | |
| 7,945,952 B1 | 5/2011 | Behforooz | |
| 8,001,597 B2 | 8/2011 | Crooks | |
| 8,082,349 B1 | 12/2011 | Bhargava et al. | |
| 8,510,795 B1 | 8/2013 | Gargi | |
| 9,256,715 B2 | 2/2016 | Draluk et al. | |
| 9,275,215 B2 | 3/2016 | Bailey | |
| 9,378,354 B2 | 6/2016 | Bailey | |
| 2003/0101357 A1 | 5/2003 | Ronen et al. | |
| 2004/0254793 A1 | 12/2004 | Herley et al. | |
| 2005/0097320 A1* | 5/2005 | Golan | G06F 21/40 713/166 |
| 2005/0144067 A1 | 6/2005 | Farahat et al. | |
| 2005/0209974 A1 | 9/2005 | Okunseinde | |
| 2006/0206941 A1 | 9/2006 | Collins | |
| 2006/0212931 A1 | 9/2006 | Shull et al. | |
| 2006/0230039 A1* | 10/2006 | Shull | H04L 63/08 |
| 2006/0282660 A1 | 12/2006 | Varghese et al. | |
| 2007/0043681 A1 | 2/2007 | Morgan et al. | |
| 2007/0124201 A1 | 5/2007 | Hu et al. | |
| 2007/0226053 A1 | 9/2007 | Carl et al. | |
| 2008/0040285 A1 | 2/2008 | Wankmueller | |
| 2008/0114885 A1 | 5/2008 | Kulkarni et al. | |
| 2008/0127302 A1 | 5/2008 | Qvarfordt et al. | |
| 2008/0133321 A1 | 6/2008 | Pennock et al. | |
| 2008/0133347 A1 | 6/2008 | Josifovski et al. | |
| 2008/0133348 A1 | 6/2008 | Reed et al. | |
| 2008/0162338 A1 | 7/2008 | Samuels et al. | |
| 2008/0189768 A1 | 8/2008 | Callahan et al. | |
| 2008/0301040 A1 | 12/2008 | Knudson et al. | |
| 2009/0012855 A1 | 1/2009 | Jamal et al. | |
| 2009/0019182 A1 | 1/2009 | Riise et al. | |
| 2009/0113294 A1 | 4/2009 | Sanghavi et al. | |
| 2009/0138723 A1 | 5/2009 | Nyang et al. | |
| 2009/0249477 A1 | 10/2009 | Punera | |
| 2009/0328163 A1 | 12/2009 | Preece | |
| 2010/0077482 A1 | 3/2010 | Adams | |
| 2011/0016052 A1 | 1/2011 | Scragg | |
| 2011/0016534 A1 | 1/2011 | Jakobsson et al. | |
| 2011/0029902 A1 | 2/2011 | Bailey | |
| 2011/0247071 A1 | 10/2011 | Hooks et al. | |
| 2012/0096557 A1* | 4/2012 | Britton | G06Q 20/4016 726/25 |
| 2012/0207046 A1 | 8/2012 | DiPietro et al. | |
| 2013/0239206 A1 | 9/2013 | Draluk et al. | |
| 2013/0276125 A1 | 10/2013 | Bailey | |
| 2013/0339186 A1 | 12/2013 | French et al. | |
| 2014/0317751 A1 | 10/2014 | Bailey | |
| 2014/0325657 A1 | 10/2014 | Bailey | |
| 2014/0380448 A1 | 12/2014 | Bailey | |
| 2015/0106888 A1 | 4/2015 | Cheng et al. | |
| 2016/0359872 A1 | 12/2016 | Yadav et al. | |

FOREIGN PATENT DOCUMENTS

| | | | |
|---|---|---|---|
| WO | WO 01/80525 A1 | 10/2001 | |
| WO | WO 2005/119648 A2 | 12/2005 | |
| WO | WO 2007/136665 A2 | 11/2007 | |
| WO | WO 2008/025019 A1 | 2/2008 | |
| WO | WO 2008/027642 A2 | 3/2008 | |
| WO | WO 2009/122302 A2 | 10/2009 | |

OTHER PUBLICATIONS

Adverlab Blog Spot, "CAPTCHA Advertising," Oct. 27, 2005. http://www.adverlab.blogspot.com/2005/10/captcha-advertising.html, retrieved on Jul. 24, 2008.
Athanasopoulos et al. "Enhanced CAPTCHAs: Using Animation to Tell Humans and Computers Apart," H. Leitol and E. Markatos (Eds): CMS 2006, LNCS 4237, pp. 97-108, 2006. IFIP international Federation for Information Processing 2006.
Chemane et al., MCDM model for selecting Internet access technologies—A case study in Mozambique. Proceedings of the International Conference on Computer as a Tool. EUROCON 2005, Belgrade, Serbia & Montenegro, Nov. 22-24, 2005. pp. 1738-1741, Nov. 22, 2005.
Delfigo Corporation. "DSGateway: Context-Based Identity Assurance," Copyright 2009. http://www.delfigosecurity.com/products, retrieved on Mar. 11, 2009.
Fischer, I. et al. "Visual CAPTCHAs for Document Authentication," 2006 IEEE 8th Workshop on Multimedia Signal Processing, MMSP '06, Victoria, Canada, Oct. 1, 2006, pp. 471-474.
Giasson, "Expand your ad network with an interactive video ad unit that generates unprecedented user engagement—and protects websites and services from hackers." Leap Marketing NuCaptcha Concept Videos. Leap Marketing Technologies. Available at http://microsoft.leapmaketing.com/. Last accessed Feb. 23, 2009. 3 pages.
Godin, S., Seth's Blog, "Commercializing Captcha," Dec. 1, 2006. http://sethgodin.typepad.com/seths_blog/2006/12/commercializing.html, retrived on May 17, 2012.
Invitation to Pay Additional Fees for PCT/IB2009/005645 mailed Sep. 2, 2009.
International Preliminary Report on Patentability for PCT/IB2009/005645 mailed Oct. 14, 2010.
International Search Report and Written Opinion for PCT/CA2014/050229 mailed Jun. 17, 2014.
Jy's Weblog, "Ads in Captchas," May 1, 2007. http://jy.typepad.com/jy/2007/01/ads_in_captchas.html.
Kearns, D., "Start-up Measures Users' Trustworthiness for Authentication into Sites," Network World, Jan. 21, 2009. http://www.networkworld.com/newsletters/dir/2009/011909id2.html, retrieved on Mar. 11, 2009.
Liao, W.-H., et al. "Embedding Information within Dynamic Visual Patterns," 2004 IEEE International Conference on Multimedia and Expo: Jun. 27-30, 2004, Taipei, Taiwan, IEEE Operations Center, Piscataway, NJ, vol. 2, Jun. 27, 2004, pp. 895-898.
Naone, E., Technology Review, "The Captcha Arms Race," Mar./Apr. 2009.
PCT Search Report Application No. PCT/IB2009/005645 dated Nov. 20, 2009.
PCT Written Opinion Application No. PCT/IB2009/005645 dated Nov. 20, 2009.
Schultz, "Reputation scoring changes the enterprise security game." ComputerWorld. Apr. 3, 2009. 3 pages.
Supplementary European Search Report from European Patent Application EP 09727261 dated Mar. 7, 2012.
Teleport Jobs Webmaster Tools, "Free CAPTCHA," Copyright 2004-2007. http://www.teleportjobs.com/captcha.asp, retrieved on Jul. 24, 2008.
U.S. Appl. No. 12/935,927, filed Oct. 1, 2010, Bailey.
U.S. Appl. No. 14/218,839, filed Mar. 18, 2014, Bailey.
U.S. Appl. No. 14/481,698, filed Sep. 9, 2014, Bailey.

(56) References Cited

OTHER PUBLICATIONS

U.S. Appl. No. 13/834,733, filed Mar. 15, 2013, Bailey.
U.S. Appl. No. 14/218,806, filed Mar. 18, 2014, Bailey.
International Preliminary Report on Patentability for PCT/CA2014/050229 mailed on Sep. 24, 2015.
Extended European Search Report from European Patent Application EP 14765198.8 dated Sep. 13, 2016.

* cited by examiner

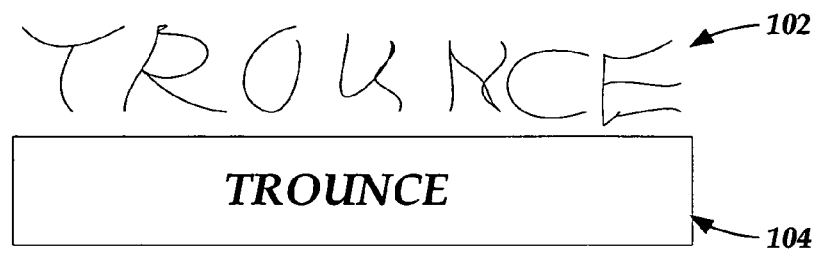
FIG. 1  <u>Prior Art</u>
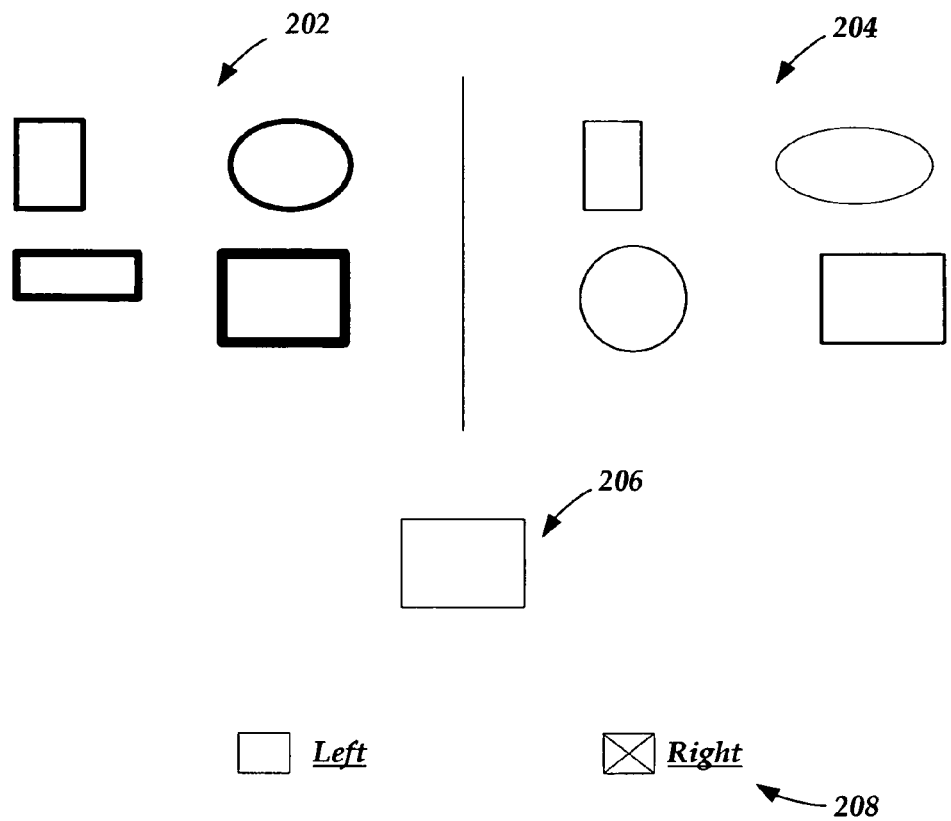
FIG. 2  <u>Prior Art</u>

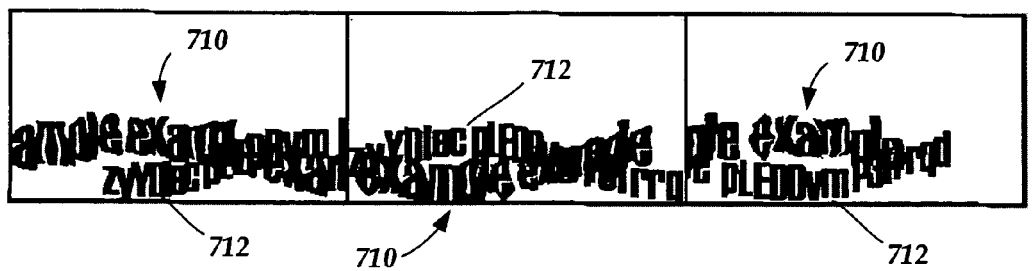
FIG. 7C
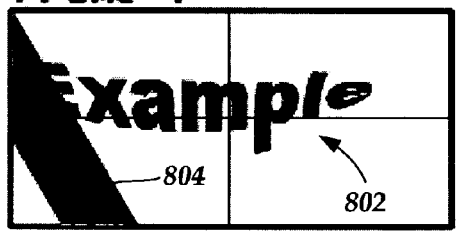 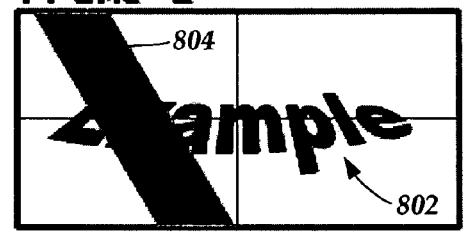
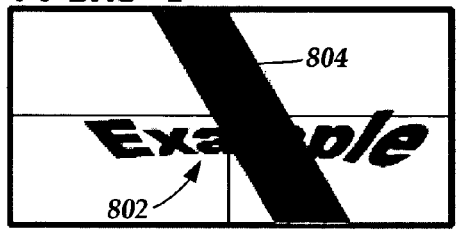 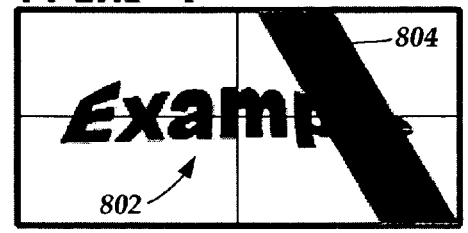
FIG. 8

Frame Generation**

Composing Images**

Mesh Generation**

Hidden AMS

Visible AMS

Risk Assessment

SYSTEMS AND METHODS FOR ASSESSING SECURITY RISK

PRIORITY APPLICATIONS

This application is a continuation of application Ser. No. 12/935,927, filed on Oct. 1, 2010, which is a national phase filing under 35 U.S.C. §371 of International Application No. PCT/IB2009/005645, filed Mar. 31, 2009, which claims priority under 35 U.S.C. §119 to U.S. Provisional Application No. 61/041,556, filed Apr. 1, 2008, and U.S. Provisional Application No. 61/050,839, filed May 6, 2008. All of these applications are hereby incorporated herein by reference in their entireties.

BACKGROUND OF INVENTION

The present disclosure relates generally to computer resource security. More particularly, the present disclosure relates to systems and methods for implementing and tracking identification tests used to authenticate users.

Conventionally, an identification test is implemented by an entity in control of a computer resource to determine to what extent, if at all, a user should be granted access to the computer resource. For example, a web site publisher may implement an identification test to authenticate a user, i.e., to determine whether the user is who he purports to be. Based on the outcome of the test, the publisher decides whether the user is authorized to access the requested resource (e.g., to view a web page, to post a comment on a discussion forum and/or to perform a transaction via the web site).

This type of identification test is conventionally implemented as a challenge-response protocol executed between the publisher and the user. The publisher generates and serves to the user a challenge message soliciting a piece of information, such as an answer to a predetermined security question and/or a value derived based on a cryptographic secret known only to an authentic user. The user must respond to the challenge by providing the solicited piece of information, and the publisher determines whether the user has passed the identification test by examining the user's response.

The publisher may also implement an identification test to determine if a user is a human user or a software robot ("bot") programmed to simulate a human user. This allows the publisher to restrict access by bots while continuing to provide access to humans, and is therefore desirable in settings where bots pose a security threat. For example, the publisher may implement this type of identification test to prevent bots from creating numerous new accounts and using the new accounts for illicit or nefarious purposes such as phishing, spoofing and/or spamming.

Some conventional identification tests for distinguishing between human users and bots incorporate static images into challenge messages to be served to users. For example, in an image-based challenge called a "Completely Automated Public Turing Test to Tell Computers and Humans Apart" ("captcha"), a static (graphic) image is presented in the challenge message and the user is asked to respond based on the content of the static image.

Several variants of static image captchas have been proposed, including the Gimpy, Bongo and Pix tests described below.

FIG. 1 shows an example of a Gimpy test, in which a word (e.g., "trounce") is selected from a dictionary and is displayed in a distorted and/or deformed fashion in a static image 102. The user is prompted to enter the displayed word in a text field 104 and is deemed to have passed the test if the entered word matches the displayed word.

FIG. 2 shows an example of a Bongo test, in which a user is prompted to solve a visual pattern recognition problem. In this example, the challenge message contains a static image that shows, on the left-hand side, symbols 202 drawn with relatively heavy line weights and, on the right-hand side, symbols 204 drawn with relatively-light line weights. The user is expected to recognize this pattern and respond by indicating to which group (left or right) a separate symbol 206 belongs. As shown in FIG. 2, the user may indicate a group by clicking on one or more check boxes 208.

In a Pix test (not shown), several different static images are displayed to a user, and the user is prompted to name a subject common to all of the displayed images.

Sound-based captchas have also been proposed to accommodate visually impaired users. For example, in an Eco test, a word or sequence of numbers is selected and rendered into a distorted sound clip. Upon playing the sound clip, a user is prompted to enter the content of the sound clip and is deemed to have passed the test if the entered word or number sequence matches the actual content of the sound clip.

SUMMARY OF INVENTION

In some embodiments, a computer system is provided, for providing an animated identification test for use in distinguishing human-generated responses from bot-generated responses. The computer system may comprise at least one processor programmed to generate and serve, via a computer network, to a user's browser a challenge graphic for display to the user by said browser, wherein the challenge graphic comprises a first plurality of characters, and wherein an appearance of the first plurality of characters changes over a time period during which the challenge graphic is displayed.

In some embodiments, the computer system may further comprise a processor adapted to receive from the user a second plurality of characters entered by the user in response to the challenge graphic, wherein said processor is further programmed to determine a result of the animated identification test at least partially by comparing the first plurality of characters and the second plurality of characters.

In some embodiments, the challenge graphic may comprise a feature that at least partially obscures at least one first character of the first plurality of characters during at least a portion of the time period.

In some embodiments, the first plurality of characters may comprise an animated character whose appearance changes over the time period.

In some embodiments, the challenge graphic may comprise at least one marketing feature adapted to convey a marketing message.

In some embodiments, the challenge graphic may further comprise at least one other character that is not part of the first plurality of characters.

In some embodiments, a computer-implemented method is provided, for providing an animated identification test. The method may comprise: with at least one server, generating and serving to a user a challenge graphic, wherein the challenge graphic comprises a first plurality of characters, and wherein an appearance of the first plurality of characters changes over a time period during which the challenge graphic is displayed.

In some embodiments, at least one computer-readable medium is provided, encoded with a plurality of instructions that, when executed by at least one processor, perform a method for providing an animated identification test. The method may comprise: with at least one server, generating and serving to a user a challenge graphic, wherein the challenge graphic comprises a first plurality of characters, and wherein an appearance of the first plurality of characters changes over a time period during which the challenge graphic is displayed.

In some embodiments, a computer-implemented method is provided, for providing an identification test. The method may comprise: receiving at a server a request for an identification test to be administered to a user in connection with a transaction; operating a computer to provide a challenge message based at least in part on information regarding the transaction, the challenge message comprising a first plurality of characters to be displayed to the user; and receiving from the user in response to the challenge message a second plurality of characters, wherein a result of the identification test is determined at least in part by comparing the first plurality of characters and the second plurality of characters.

In some embodiments, at least one computer-readable medium is provided, encoded with a plurality of instructions that, when executed by at least one processor, perform a method for providing an identification test. The method may comprise: receiving at a server a request for an identification test to be administered to a user in connection with a transaction; operating a computer to provide a challenge message based at least in part on information regarding the transaction, the challenge message comprising a first plurality of characters to be displayed to the user; and receiving from the user in response to the challenge message a second plurality of characters, wherein a result of the identification test is determined at least in part by comparing the first plurality of characters and the second plurality of characters.

In some embodiments, a computer system is provided, for providing an animated identification test. The computer system may comprise: at least one first communication interface adapted to receive a request for an identification test to be administered to a user in connection with a transaction; at least one processor programmed to provide a challenge message based at least in part on information regarding the transaction, the challenge message comprising a first plurality of characters to be displayed to the user; and at least one second communication interface adapted to receive from the user in response to the challenge message a second plurality of characters, wherein a result of the identification test is determined at least in part by comparing the first plurality of characters and the second plurality of characters.

In some embodiments, the at least one processor is further programmed to determine a difference between the first plurality of characters and the second plurality of characters.

In some embodiments, the information regarding the transaction comprises an identifier for the user.

In some embodiments, the information regarding the transaction comprises information signifying a purpose of the identification test.

In some embodiments, the information regarding the transaction is provided in the request for an identification test.

In some embodiments, the at least one first communication interface is further adapted to transmit a token message in response to the request for an identification test; the at least one process is further programmed to store first token information associated with the token message; and the at least one second communication interface is further adapted to receive from the user a data request comprising second token information associated with the token message, wherein the challenge message is provided based at least in part on the first and second token information.

In some embodiments, the at least one processor is programmed to provide a challenge message at least in part by determining a difficulty category of the challenge message based at least in part on the information regarding the transaction.

In some embodiments, the at least one processor is programmed to provide a challenge message at least in part by selecting a marketing message based at least in part on the information regarding the transaction.

In some embodiments, a computer-implemented method is provided, for analyzing responses in animated identification tests. The method may comprise: operating at least one first computer to monitor responses to a plurality of animated identification tests; associating each response with a same user identifier; measuring at least one characteristic of the responses to identify a pattern; and providing, based at least in part on the identified pattern, score information in association with the user identifier, the score information indicative of a level of trustworthiness.

In some embodiments, at least one computer-readable medium is provided, encoded with a plurality of instructions that, when executed by at least one processor, perform a method for analyzing responses in animated identification tests. The method may comprise: operating at least one first computer to monitor responses to a plurality of animated identification tests; associating each response with a same user identifier; measuring at least one characteristic of the responses to identify a pattern; and providing, based at least in part on the identified pattern, score information in association with the user identifier, the score information indicative of a level of trustworthiness.

In some embodiments, a computer system is provided, for analyzing responses in animated identification tests. The computer system may comprise at least one processor programmed to: monitor responses to a plurality of animated identification tests; associate each response with a same user identifier; measure at least one characteristic of the responses to identify a pattern; and provide, based at least in part on the identified pattern, score information in association with the user identifier, the score information indicative of a level of trustworthiness.

In some embodiments, the at least one processor is further programmed to: store the score information in association with the user identifier; receive a request for an animated identification test; associate the request for an animated identification test with the user identifier; and provide an animated identification test based at least in part on the score information stored in association with the user identifier.

In some embodiments, the at least one characteristic comprises an amount of time between delivering a challenge message and receiving a response to the challenge message.

In some embodiments, the responses are actual responses, and the at least one characteristic comprises a difference between an actual response and a correct response.

In some embodiments, the at least one processor is further programmed to monitore a rate at which requests for animated identification tests are received at the computer, the requests for animated identification tests being associated with the user identifier.

In some embodiments, the at least one processor is further programmed to monitor a time of day at which a request for an animated identification test is received, the request for an animated identification test being associated with the user identifier.

In some embodiments, the at least one processor is further programmed to: determine, based at least in part on the responses to the plurality of animated identification tests, that the user identifier is associated with a bot attack; and provide an updated assessment regarding at least one of the plurality of animated identification test, the updated assessment being different from an earlier assessment given to the at least one of the plurality of animated identification test.

In some embodiments, the score information comprises information indicative of a purpose of at least one of the plurality of animated identification tests.

In some embodiments, a computer-implemented method is provided, for determining an access privilege to be granted to a user to allow a user to access a computer resource. The method may comprise: operating at least one first computer to determine a user identifier associated with the user; with at least one second computer, receiving score information associated with the user identifier, the score information obtained at least in part by analyzing a plurality of responses in past animated identification tests associated with the user identifier; and operating at least one third computer to determine the access privilege to be granted to the user based at least in part on the score information.

In some embodiments, at least one computer-readable medium is provided, encoded with a plurality of instructions that, when executed by at least one processor, perform a method for determining an access privilege to be granted to a user to allow a user to access a computer resource. The method may comprise: operating at least one first computer to determine a user identifier associated with the user; with at least one second computer, receiving score information associated with the user identifier, the score information obtained at least in part by analyzing a plurality of responses in past animated identification tests associated with the user identifier; and operating at least one third computer to determine the access privilege to be granted to the user based at least in part on the score information.

In some embodiments, a computer system is provided, for determining an access privilege to be granted to a user to allow a user to access a computer resource. The computer system may comprise: at least one first processor programmed to determine a user identifier associated with the user; at least one communication interface adapted to receive score information associated with the user identifier, the score information obtained at least in part by analyzing a plurality of responses in past animated identification tests associated with the user identifier; and at least one second processor programmed to determine the access privilege to be granted to the user based at least in part on the score information.

In some embodiments, the at least one communication interface is further adapted to transmit a request for an animated identification test to be served to the user; and the at least one second processor is further programmed to associate the request with the user identifier, wherein the access privilege to be granted to the user is determined based at least partially on a result of the animated identification test.

In some embodiments, a computer-implemented method is provided, for providing an identification test. The method may comprise: at a server, receiving a request for an identification test; associating the request with a user identifier; retrieving from a computer-readable memory challenge information associated with the user identifier; and generating, based at least in part on the challenge information, a challenge message to be served to a user, the challenge message comprising a first plurality of characters, wherein an appearance of the first plurality of characters changes over a time period during which the challenge message is served.

In some embodiments, at least one computer-readable medium is provided, encoded with a plurality of instructions that, when executed by at least one processor, perform a method for providing an identification test. The method may comprise: at a server, receiving a request for an identification test; associating the request with a user identifier; retrieving from a computer-readable memory challenge information associated with the user identifier; and generating, based at least in part on the challenge information, a challenge message to be served to a user, the challenge message comprising a first plurality of characters, wherein an appearance of the first plurality of characters changes over a time period during which the challenge message is served.

In some embodiments, a computer system is provided, for providing an identification test. The computer system may comprise: at least one communication interface adapted to receive a request for an identification test; and at least one first processor programmed to associate the request with a user identifier, retrieve from a computer-readable memory challenge information associated with the user identifier, and generate, based at least in part on the challenge information, a challenge message to be served to a user, the challenge message comprising a first plurality of characters, wherein an appearance of the first plurality of characters changes over a time period during which the challenge message is served.

In some embodiments, the computer system for providing an identification test may further comprise at least one second communication interface adapted to receive a second plurality of characters entered by the user in response to the challenge message; and at least one second processor programmed to determine a result of the identification test based, at least partially, on the challenge information and the second plurality of characters.

In some embodiments, a computer-implemented method is provided, for providing a marketing service. The method may comprise: with at least a first server, providing a web page to enable a first user to submit marketing content; with at least a second server, generating and serving to a second user a challenge message for an identification test, wherein the challenge message is generated based at least in part on marketing content received from the first user, and wherein the challenge message comprises a first plurality of characters; and receiving from the second user in response to the challenge message a second plurality of characters, wherein a result of the identification test is determined at least in part by comparing the first plurality of characters and the second plurality of characters.

In some embodiments, at least one computer-readable medium is provided, encoded with a plurality of instructions that, when executed by at least one processor, perform a method for providing a marketing service. The method may comprise: with at least a first server, providing a web page to enable a first user to submit marketing content; with at least a second server, generating and serving to a second user a challenge message for an identification test, wherein the challenge message is generated based at least in part on marketing content received from the first user, and wherein the challenge message comprises a first plurality of characters; and receiving from the second user in response to the challenge message a second plurality of characters, wherein a result of the identification test is determined at least in part by comparing the first plurality of characters and the second plurality of characters.

In some embodiments, a computer system is provided, for providing a marketing service. The computer system may comprise: at least a first server adapted to provide a web page to enable a first user to submit marketing content; at least a second server adapted to generate and serve to a second user a challenge message for an identification test, wherein the challenge message is generated based at least in part on marketing content received from the first user, and wherein the challenge message comprises a first plurality of characters; and at least one communication interface adapted to receive from the second user in response to the challenge message a second plurality of characters, wherein a result of the identification test is determined at least in part by comparing the first plurality of characters and the second plurality of characters.

In some embodiments, the at least one communication interface is further adapted to receive from the second user a quality assessment of the challenge message.

In some embodiments, a computer-implemented method is provided, for providing an identification test. The method may comprise: with at least one server, generating and serving to a user a challenge message comprising a first plurality of characters to be displayed to the user, wherein the first plurality of characters comprises a second plurality of characters that is associated with marketing content promoting one or more goods and/or services a second plurality of characters, and wherein the first plurality of characters further comprises a third plurality of characters that is selected randomly or pseudo-randomly; and receiving from the user in response to the challenge message a fourth plurality of characters, wherein a result of the identification test is determined at least in part by comparing the first plurality of characters and the fourth plurality of characters.

In some embodiments, at least one computer-readable medium is provided, encoded with a plurality of instructions that, when executed by at least one processor, perform a method for providing an identification test. The method may comprise: with at least one server, generating and serving to a user a challenge message comprising a first plurality of characters to be displayed to the user, wherein the first plurality of characters comprises a second plurality of characters that is associated with marketing content promoting one or more goods and/or services a second plurality of characters, and wherein the first plurality of characters further comprises a third plurality of characters that is selected randomly or pseudo-randomly; and receiving from the user in response to the challenge message a fourth plurality of characters, wherein a result of the identification test is determined at least in part by comparing the first plurality of characters and the fourth plurality of characters.

In some embodiments, a computer system is provided, for providing an identification test. The computer system may comprise: at least one server adapted to generate and serve to a user a challenge message comprising a first plurality of characters to be displayed to the user, wherein the first plurality of characters comprises a second plurality of characters that is associated with marketing content promoting one or more goods and/or services a second plurality of characters, and wherein the first plurality of characters further comprises a third plurality of characters that is selected randomly or pseudo-randomly; and at least one communication interface adapted to receive from the user in response to the challenge message a fourth plurality of characters, wherein a result of the identification test is determined at least in part by comparing the first plurality of characters and the fourth plurality of characters.

BRIEF DESCRIPTION OF DRAWINGS

In the drawings:

FIG. 1 shows an example of a Gimpy captcha image or message;

FIG. 2 shows an example of a Bongo captcha image or message;

FIGS. 7B and 7C each show three frames of an illustrative identification test captured over a period of time, with a clutter feature in accordance with some embodiments of systems and methods discussed herein;

FIG. 8 shows four frames of an illustrative identification test captured over a period of time, with a character obscuring feature in accordance with some embodiments of systems and methods discussed herein;

DETAILED DESCRIPTION

I. Overview

Figure 3:
FIG. 3 shows four different types of possible distortions that may be applied to characters of a challenge character set of an identification test, in accordance with some embodiments of systems and methods discussed herein.

The inventor has appreciated that, as computers have become faster and software and hardware more sophisticated, conventional identification tests such as conventional captchas have become increasingly less effective in distinguishing between human users and bots. For example, bot programmers have developed sophisticated techniques for recognizing distorted characters in Gimpy-style tests. However, conventional attempts to thwart the ability of bots to solve identification tests have resulted in identification tests becoming more difficult for human users as well.

The inventor has recognized that, by contrast, animation may be employed in an image-based identification test to increase the level of difficulty for bots, without making the identification test excessively difficulty for humans. In some instances, the use of animation may even enhance the ability of human users to solve the identification test (e.g., by making distorted, overlapping and/or partially obscured characters easier for a human user to recognize).

The inventor has also appreciated that an animated identification test may include much more information than a static identification test. Since the information is spread out over a period of time, a bot attempting to solve an identification test may need to process much more information than with a static identification test, and thereby consume more resources. Consequently, a bot designer may be discouraged from attempting to use a bot to access a web page employing an animated identification test.

Various systems and methods will now be presented, involving a number of inventive aspects. Some embodiments will be discussed but these embodiments are not intended to be exhaustive. The appended claims define the invention with particularity and it is not the intention to here in any way suggest the invention be understood in any way other than as defined in those claims. Indeed, it will be appreciated that the claims define various aspects of the invention that may be practiced separately or together, and that the claims cover embodiments that as a general rule may be practiced either independently or together, as circumstances permit. Thus, there is no general intention that embodiments are mutually exclusive though in some instances that may be the situation. Further, the independent claims contain different limitations and different combinations of limitations. Accordingly, no reference to "the invention" or "the present invention" is intended to refer to all claimed subject matter.

In some aspects and embodiments, a system for implementing an animated (i.e., time-varying) identification test is provided, which includes a suitably programmed computer that generates and serves to a user a challenge graphic having a plurality of challenge characters that the user is expected to identify in order to pass the identification test. The appearance of the plurality of challenge characters may change over a time period during which the challenge graphic is displayed. As discussed in greater detail below, the change in appearance may be effected in a number of different ways. For example, two challenge characters may overlap each other in a time-varying manner (e.g., the degree of overlap may become greater or smaller and/or the challenge characters may overlap at different angles). This may increase the difficulty for bots to segment and decode the individual challenge characters. On the other hand, the time-varying nature of the overlap may make it easier for human users to identify the challenge characters.

As another example, the plurality of challenge characters may be partially obscured by one or more features incorporated into the challenge graphic, where at least one feature is not part of the plurality of challenge characters. Such features, also referred to as "clutter" features, may comprise any combination of lines, curves, bars, blobs, symbols, any regular- or irregular-shaped objects, and even additional characters. As discussed in greater detail below, a manner in which the plurality of challenge characters is obscured by clutter may vary in time, for example, by animating the plurality of challenge characters and/or the clutter features, so that one or more the them move, rotate, change size or undergo some other transformation(s). Again, the presence of clutter may make it more difficult for bots to segment and decode individual challenge characters, while the relative movement of the plurality of challenge characters and the clutter features may help human users identify the challenge characters more easily.

The inventor has further recognized that three-dimensional (3D) rendering techniques may be used to generate challenge graphics for identification tests. In some embodiments, a 3D mesh is created for one or more challenge characters to be transcribed by a user in an identification test and are manipulated to change the appearance of the challenge characters. This technique may be used to produce many visual effects, such as warping in any arbitrary manner, zooming in or out, and/or changing a view frustum. The inventor has appreciated that these visual effects may improve the effectiveness of the identification tests in distinguishing between bots and humans, because humans are naturally adept at recognizing 3D shapes and objects, while the problem is made more complex for bots.

It should be appreciated that the term "character" is not limited to characters in the English alphabet or the alphabet of any other language. Rather, "character" is used herein to refer broadly to any graphical feature, such as a symbol, a letter, a number, a punctuation mark, an ideogram, a wingding character, an emoticon, a geometric form, an unrecognizable form (e.g., an "inkblot") or even an image (e.g., an image of an animal or an object).

The inventor has further appreciated that conventional techniques for implementing identification tests may be limited in a number of aspects. For example, identification tests are conventionally implemented on a per-transaction basis by individual publishers. There is no tracking or correlation of identification tests administered during different transactions (e.g., transactions associated with a same user during a certain time period), nor any form of dynamic feedback (e.g., selecting a more or less difficult identification test to be served to a user based on history information accumulated for the user during earlier transactions). There is also no sharing or aggregation of identification test information across multiple publishers (e.g., total number of new accounts opened by a same user with different publishers during a certain time period). As a result, valuable information regarding users and their behaviors may not be recorded and utilized to the fullest extent possible.

It should be appreciated that the terms "user" and "publisher" are used herein to refer broadly to any entity engaged in one or more electronic transactions. While in some embodiments a publisher is an entity that requests an identification test for access control purposes and a user is an entity to whom an identification test is administered, the present disclosure is not so limited. Also, the terms "access" or "access to resources," as used herein, may refer broadly to any type of access, such as viewing a web page, posting a comment, performing a transaction, or even establishing a connection. In some embodiments, a server (such as a web server) may be considered a resource, and an access to the server may comprise any generic action performed on the server, for example, connecting to the server, performing administrative actions relating to an account on the server and/or sending a message via the server.

Additionally, the terms "computer" and "system" are used herein to refer broadly to any device or collection of devices having a programmed processor. Examples of a computer or a system may include desktop computers, laptop computers, mobile phones, and/or personal data assistants (PDAs).

In some embodiments, systems and methods are provided for implementing and tracking identification tests. Such a system may include one or more servers which administer an identification test to the user. In some embodiments, the one or more servers may be operated by a third-party entity, and may administer the identification test at the request of a publisher and/or in cooperation with one or more systems run by the publisher. However, it should be appreciated that a third-party structure such as the one described above is not required.

In some embodiments, a system for implementing and tracking identification tests is provided, which provides a challenge message to a user in an identification test based on information regarding a transaction in connection with which the identification test is administered. The transaction information may include a user identifier (e.g., an IP address associated with the user), a purpose of the identification test (e.g., loading a web page, opening a new account, and/or posting a message), and/or any other suitable information.

The system may select a challenge message with a desired attribute (e.g., a desired level of difficulty) based on the transaction information.

In some embodiments, a system for analyzing responses in identification tests is provided, which monitors multiple identification tests associated with a same user and measures at least one characteristic of the responses to identify a pattern of behaviors. Based on the measurements and/or any identified patterns, the system may assign a score to the user indicative of a level of trustworthiness (or some other suitable characteristics). The response characteristics measured by the system may include a response time, a likelihood that an incorrect response is the result of human error (e.g., a typographical or spelling error), a rate at which responses are received from the same user, times of day at which the responses are received, and/or any other suitable characteristics.

In some embodiments, a score associated with a user may be used in selecting a challenge message to be served to the user in a subsequent identification test. For example, a score may be indicative of a level of perceived risk associated with a user and a more difficult challenge message may be served to a user with a higher score (when the scoring rubric is that a higher score is correlated to higher perceived risk, of course). Additionally, or alternatively, a score (or derived value) may be provided to a publisher to enable the publisher to determine one or more appropriate access privileges to be granted to the user. For example, the score may be used by the publisher in conjunction with a result of an identification test to determine an appropriate access privilege.

It should be appreciated that a "score" need not be a numeric score and may comprise any suitable performance characterization structured in any suitable way. For example, it may contain raw measurements obtained from user responses and/or descriptions of behavioral patterns identified and compiled by the system.

The inventor has recognized that identification tests may be utilized as a marketing vehicle. In some embodiments, a system is provided that generates challenge graphics to be used in identification tests based on marketing contents (e.g., marketing messages promoting one or more goods and/or services). For example, marketing content may be incorporated into a challenge graphic as one or more graphical features and/or textual messages. A user may be highly motivated to view the marketing content because it is delivered in the context of an identification test that the user wishes to complete. Additionally, or alternatively, a marketing message may be included as part of a character string that a user must identify and transcribe in order to successfully complete the identification test. This level of user focus and direct engagement may be highly effective in reinforcing the marketing message in the user's mind.

The inventor has further appreciated that identification tests generated based on a relatively small collection of marketing contents may not be sufficiently difficult for bots, because a bot may have a high success probability by simply guessing a marketing message. In some embodiments, a web site may be provided to enable users to submit marketing content to be incorporated in one or more identification tests to be administered to other users, thereby increasing the diversity of marketing contents from which identification tests are generated. Additionally, or alternatively, randomly selected content may be incorporated into an identification test along with marketing content (e.g., by appending or otherwise inserting in a suitable manner one or more randomly selected characters to a marketing message and requiring a user to transcribe both the marketing message and the randomly selected character(s)). Both of these techniques may reduce the likelihood that a bot can successfully complete the identification tests by guessing.

It should be appreciated that "marketing content" is used herein to refer broadly to any content to be distributed, whether or not purposed to sell goods or services. Examples of marketing content include, but are not limited to, commercial advertisements for goods and/or services, political and/or non-political campaign messages, directions to a user (e.g., to activate a button), questions to a user (e.g., "What is 5+2?" or "What is the capital of Canada?") and/or user-defined questions (e.g., security questions).

Some illustrative embodiments are described in greater detail below in connection with FIGS. 3-24. However, it should be appreciated that various inventive aspects may be used alone, in combination, or in a variety of arrangements not specifically discussed in the embodiments described herein, and that they are therefore not limited in their applications to the details and arrangements of components set forth in the following description or illustrated in the drawings. For example, aspects described in connection with one embodiment may be combined in any manner with aspects described in other embodiments.

II. Examples of Challenge Graphics

FIGS. 3-9 illustrate examples of graphical features that may be included in a challenge graphic of an identification test. These features may be static or animated, and may be positioned on static or animated images to form challenge graphics. In some embodiments, one or more animated components of a challenge graphic may be displayed in one or more timed loops that repeat one or more times until an event occurs, such as a user entering a response in one or more fields, a user logging off, or the like.

In some embodiments, the graphical features may include two or more characters strung together to form a challenge character set that a user is expected to recognize and transcribe. Although not required, the challenge character set may include one or more words or phrases. The challenge character set may additionally, or alternatively, include two or more characters strung together to form one or more random or nonsensical groupings of characters.

In some embodiments, one or more security enhancing techniques may be applied in generating a challenge graphic for an identification test. Some suitable techniques may include, for example, character distortion, character movement, addition of characters that are not part of a challenge character set, multiple layers of graphics, variable intermittent omission of selected characters, variable intermittent obscuring of selected characters, and transient characters. A suitable combination of these techniques may result in an identification test that is acceptably difficult for a bot to solve. In some embodiments, a combination of these techniques may result in an identification test that is more difficult for a bot to solve than conventional captchas, but not more difficult for a human user to solve. In some embodiments, a combination of these techniques may even make an identification test less difficult for a human user to solve.

II.A. Character Distortion

FIG. 3 shows four different types of possible distortions that may be applied to characters of a challenge character set of an identification test. In some embodiments, one or more characters may be arced, such as arced character groupings 302 showing respectively the character strings "Arcing 1," "Arcing 2," "Arcing 3" and "Arcing 4." In some embodiments, one or more characters may be bulged (i.e., magnified in a distorted way), such as bulged character groupings 304 showing respectively the character strings "Bulging 1" and "Bulging 2." In some embodiments, one or more characters may be wavy, such as waved character groupings 306 showing respectively the character strings "The Wave 1" and "The Wave 2." In some embodiments, one or more characters may be twisted, such as twisted character groupings 308 showing respectively the character strings "Twist 1" and "Twist 2.".

It should be appreciated that these four types of distortions are merely examples, as other types of distortions may also be suitable. Additionally, one or more different types of distortions may be applied concurrently to the same characters, to different characters, or to portions of the same characters. For example, a given distortion may fade into non-distortion, or to another type of distortion along the length of a character, along a string of one or more character groupings, or along an entire challenge character set.

In some embodiments, the application of one or more security enhancing techniques other than distortion may be employed. Such techniques may, but need not, also lessen the amount of distortion needed to fend off bot attacks, which may make an identification test easier for a human user to solve. For example, one or more of the following types of character movements may be applied:

1) one or more characters may move within an image over time;
2) one or more characters may move together;
3) each character may move independently in the same direction, or in a different direction, as one or more other characters, with a similar or a different type of movement;
4) movements of one or more characters may follow one or more patterns or may be random in velocity, direction, and/or duration over a given period of time;
5) one or more of the characters may change orientation over time (e.g., by rotating, swiveling, rocking, and/or flipping);
6) portions of one or more characters may internally move while either remaining in a constant position in an image or while moving about an image;
7) one or more characters (or portions of one or more characters) may throb, pulsate, beat, undulate, flap, shake, wag, flutter, pulse, pound, vibrate, expand, contract, flicker, rattle, and/or roll; and
8) the distances between adjacent characters may increase or decrease.

II.B. Character Overlap

Figure 4A:
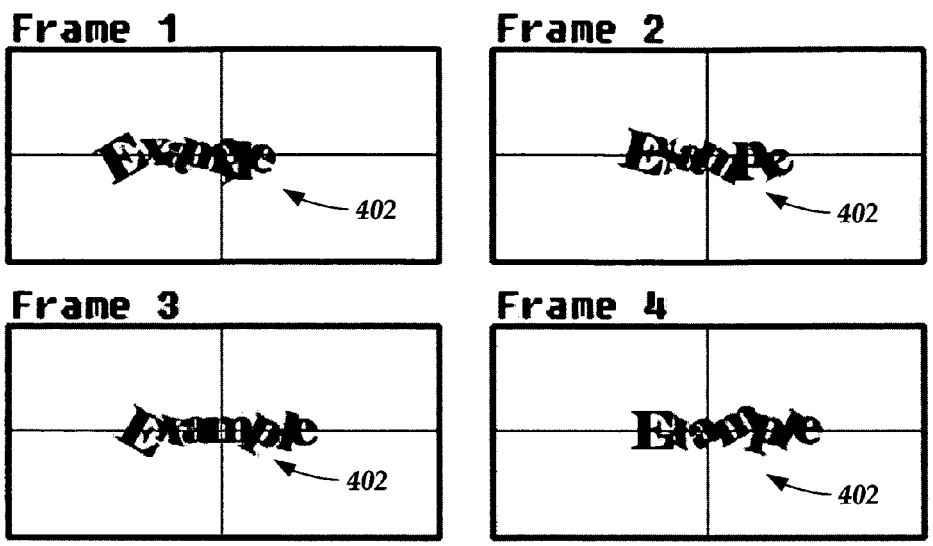
FIG. 4A shows four frames of an illustrative identification test captured over a period of time, with a character overlapping feature in accordance with some embodiments of systems and methods discussed herein.

In some embodiments, character overlap may be used as a security enhancing technique. FIG. 4A shows four frames (Frame 1-Frame 4) of an illustrative identification test captured over a period of time, each of the frames including a same string of characters that forms a challenge character set 402. In this example, the challenge character set 402 includes individual characters that overlap one another in a time-varying manner. For example, in Frame 1, the character "p" overlaps the character "1" both at an upper portion and at a lower portion of the character "1," while in Frame 2, the character "p" overlaps the character "1" only at an upper portion of the character "1." Continuing to Frame 3, the character "p" does not overlap the character "1" at all, while in Frame 4 the character "p" overlaps the character "1" only at a lower portion of the character "1."

As shown in the example of FIG. 4A, characters in the challenge character set 402 may overlap one another in such a way that the amount and/or the location of an overlap may vary over time. Additionally, the challenge character set 402 may include characters that rock back and forth or undergo other transformations. For example, the characters may rock back and forth individually or collectively. As an another example, the characters may rock back and forth about multiple axes.

Figure 4B:
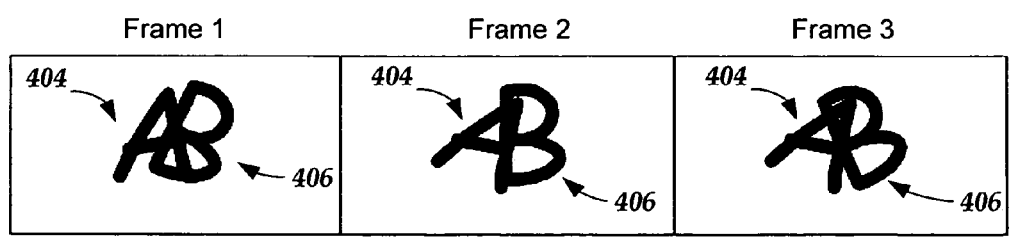
FIG. 4B shows three frames of an illustrative identification test captured over a period of time, with a character overlapping feature in accordance with some embodiments of systems and methods discussed herein.

FIG. 4B shows three frames (Frame 1-Frame 3) of another illustrative challenge graphic captured over a period of time, each frame including the same characters 404 ("A") and 406 ("B"). In this example, the appearance of each of the characters 404 and 406 changes over time. For example, the characters 404 and 406 may each rotate in a different direction and/or at a different rate, so that an angle at which the characters 404 overlap each other may also vary over time. For example, as shown in FIG. 4B, the character 404 rotates clockwise from Frame 1 to Frame 3, while the character 406 rotates counterclockwise from Frame 1 to Frame 3. As a result, the character 404 overlaps the character 406 at a lower portion of the character 406 in Frame 1, but at an upper portion of the character 406 in Frame 3.

II.C. Additional Characters

Figure 5:
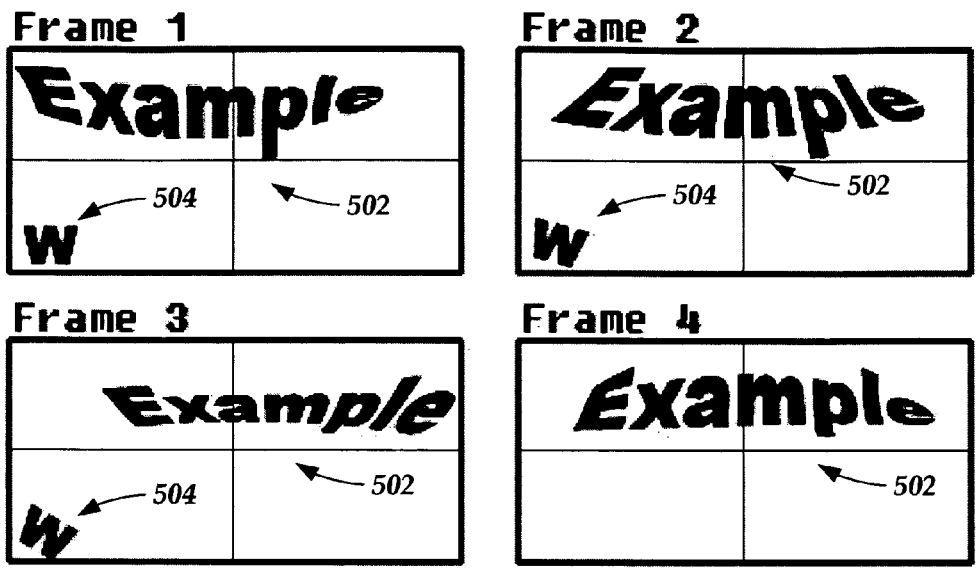
FIG. 5 shows four frames of an illustrative identification test captured over a period of time, with an additional character feature in accordance with some embodiments of systems and methods discussed herein.

In some embodiments, a security enhancing technique may include displaying one or more additional characters that are not part of a challenge character set. FIG. 5 shows four frames of an illustrative identification test captured over a period of time, in which some of the frames include an additional character(s) 504 (e.g., "W") that is not part of a challenge character set 502 (e.g., "Example"). When one or more additional characters, such as the additional character "W" 504, is or are added to a frame, different techniques may be applied to aid a human user in distinguishing between the additional characters from the challenge character set. For example, the additional characters may differ from the challenge character set in one or more aspects, including appearance, movement, and/or duration of time displayed.

II.D. Multiple Layers of Animation

Figure 6:
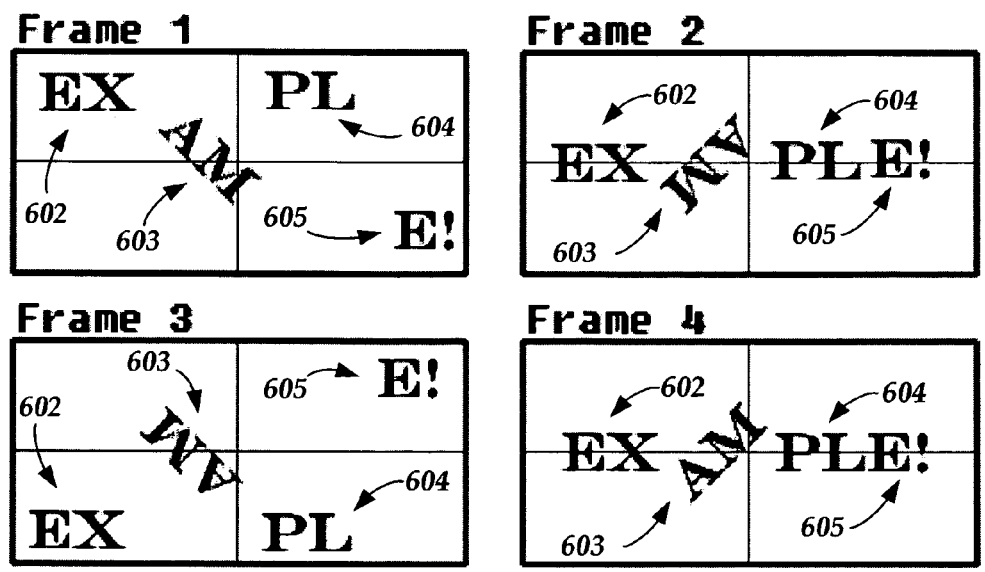
FIG. 6 shows four frames of an illustrative identification test captured over a period of time, with a multiple frame feature in accordance with some embodiments of systems and methods discussed herein.

In some embodiments, multiple layers of animation may be used to implement different types of movements within a challenge graphic. For example, multiple layers of animation may be incorporated into a challenge character set. FIG. 6 shows four frames of an illustrative identification test captured over a period of time, each frame including multiple layers of characters moving independently from one another. In this example, the challenge character set "EXAMPLE!" is divided into four layers 602-605, each including a portion of the challenge character set. Each of the layers 602-605 may move independently from the others. Additionally, characters within at least one of the layers 602-605 may differ in appearance from at least one other of the layers 602-605, and/or two or more of the layers 602-605 may move in concert for all, or a portion, of the duration of time in which the challenge graphic is displayed.

As another example, characters in a challenge graphic (e.g., characters in the challenge character set and/or additional characters as discussed above) may be divided into multiple groups in any suitable manner. Each group may correspond to a different layer and may include different visual effects. In some embodiments, the groups of characters may pulsate, fade in and out, or otherwise appear and disappear in different frames of animation in a complementary manner. For example, a challenge character set may comprise a word "test," divided into two groups, such as "te" (group 1) and "st" (group 2). Additional characters "abcd" may also be included and divided into, for example, two groups, "ab" (group 3) and "cd" (group 4). These groups may be animated in such a way that one or more groups may be visible while one or more other groups may be invisible in a frame. For example, at a given instant, groups 1 and 4 may be visible and groups 2 and 3 may be invisible. Visibility of the groups may vary smoothly over time, e.g., by fading in and out, or abruptly. Thus, invisibility may be a matter of degree, rather than an absolute condition. Additionally, visibility of the different groups may vary over time in a coordinated manner, so that some groups may become visible as some other groups become invisible.

Of course, the transformations discussed above are not exhaustive, but are only illustrative.

II.E. Clutter

In some embodiments, a challenge graphic may include one or more graphical features other than the challenge character set. These graphical features may be incorporated into the background and/or foreground of the challenge graphic. Alternatively, or additionally, these graphical features may be layered above and/or below at least a portion of a challenge character set to at least partially obscure the portion of the challenge character set. Such graphical features are herein referred to, generally, as "clutter."

Figure 7A:
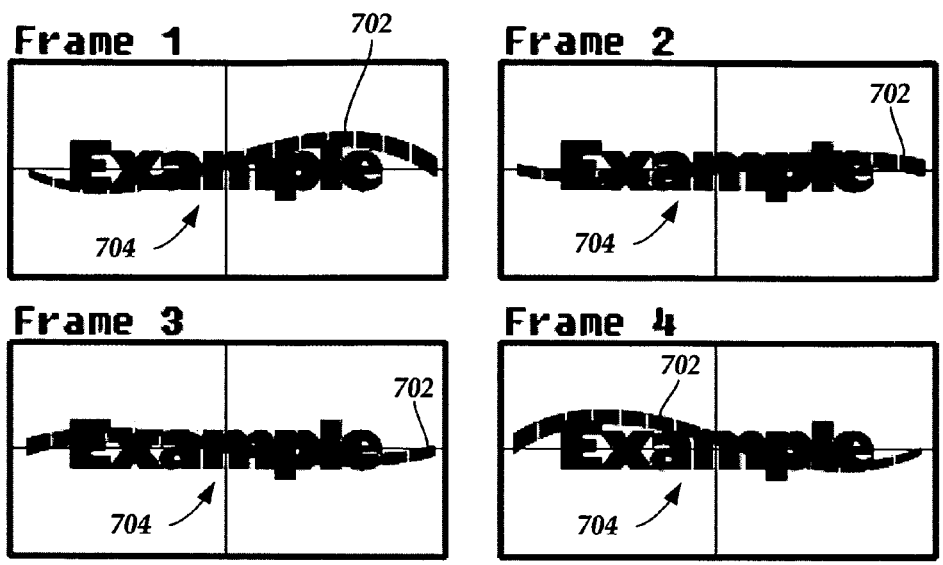
FIG. 7A shows four frames of an illustrative identification test captured over a period of time, with a clutter feature in accordance with some embodiments of systems and methods discussed herein.

FIG. 7A shows four frames of an illustrative identification test captured over a period of time, each frame including a layer of clutter animation 702 overlaid onto a challenge character set 704. In this example, the layer of clutter animation 702 includes a substantially horizontal line that vertically bifurcates the challenge character set 704. This may make it more difficult for a bot to segment and decode individual characters in the challenge character set.

Figure 7B:
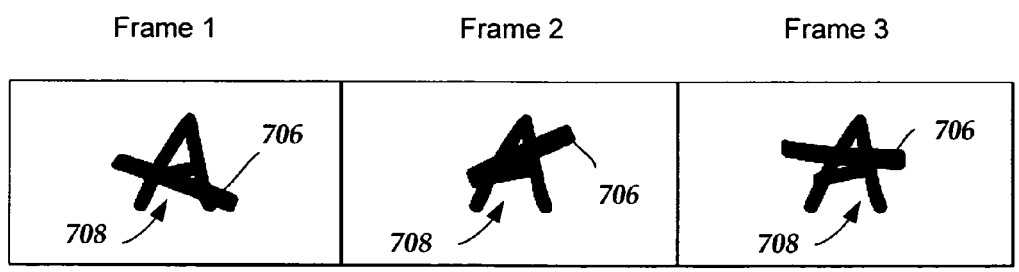

FIG. 7B shows three frames of another illustrative identification test captured over a period of time, each frame including a layer of clutter animation 706 overlaid onto a character 708 (e.g., "A"). In this example, the layer of clutter animation 706 includes a bar moving across different portions of the character 708. The bar may move in different directions over time, and/or it may have changing shapes and/or orientation. These and similar techniques may make it more difficult for a bot to decode the character 708.

In addition to a line or a bar, other suitable features may also be used as clutter, such as blobs, symbols, any regular- or irregular-shaped figures, and even additional characters or character strings that are not part of a challenge character set (e.g., randomly selected characters, randomly selected words, and/or a suitable combination thereof). These features may be incorporated into one or more layers of animation overlaid onto a challenge character set. Also, clutter need not be animated, and static clutter may also be used in addition to, or in conjunction with, animated clutter.

FIG. 7C shows three frames of an illustrative identification test captured over a period of time, each frame including a layer of clutter 712 overlaid on a challenge character set 710 (e.g., "example"). In this example, a meaningful word is used in the challenge character set and a string of random characters is used as clutter, which may aid a human user in distinguishing the clutter from the challenge character set because a human user may be naturally drawn to the meaningful word in the challenge character set. Additionally, the clutter characters may be animated independently from the challenge character set, which may further assist a human user in distinguishing the clutter from the challenge character set. The human user may naturally recognize different patterns of motion and use the differences as hints for distinguishing between the clutter and the challenge character set. By contrast, it may be more difficult for a bot to perform a similar separation.

In some embodiments, clutter characters may be rendered so that they are more readily recognizable by a bot compared to characters in a challenge character set. This technique may increase the likelihood that a bot detects a clutter character and includes the detected clutter character in a response to an identification test. Therefore, accurate bot detection may be achieved by looking for any character in the response that is part of one or more clutter features but not part of the challenge character set. That is, a user may be determined to be a bot if a response returned by the user contains a character that is only found in clutter.

II.F. Variable Intermittent Omission/Obscuring of Selected Characters

In some embodiments, some of the characters of a challenge character set may be omitted and/or obscured in one or more frames during administration of an identification test. For example, at any given time during an identification test, one or more characters of the challenge character set may be at least partially absent (e.g., disappearing or fading out), or at least partially obscured by one or more layers of static or animated graphics. The static or animated (i.e., moving and/or time-varying) graphics may take many different forms, such as a straight or curved bar, a block, a geometric figure, an irregular-shaped figure, and/or a character. A suitable combinations of these forms may also be used. Additionally, one or more features beneath one or more characters may move, appear, or disappear, to create one or more empty spaces where characters used to be.

FIG. 8 shows four frames of an illustrative identification test captured over a period of time, each frame including a challenge character set 802. In each frame, at least one of the characters of the challenge character set 802 is at least partially obscured by a moving bar 804 layered above or below the challenge character set 802.

In some embodiments, the appearance of one or more characters of the challenge character set 802 may change while being at least partially obscured by the moving bar 804. For example, one or more characters of the challenge character set 802 may be distorted in different manners, move in different directions, and/or change orientation, while being at least partially obscured by the moving bar 804.

It should be appreciated that any number of layers of graphics (e.g., two or more moving bars) may be layered above and/or below the challenge character set 802. In some embodiments, the additional graphics may be layered above or below, or even in between, layers that form the challenge character set 802. For example, each character in the challenge character set 802 may correspond to a different layer and the additional graphics may be layered between at least some of the different layers. These additional graphics may be used to selectively block or obscure certain layers of the challenge character set 802, without blocking or obscuring other layers.

II.G. Transient Characters

Figure 9:
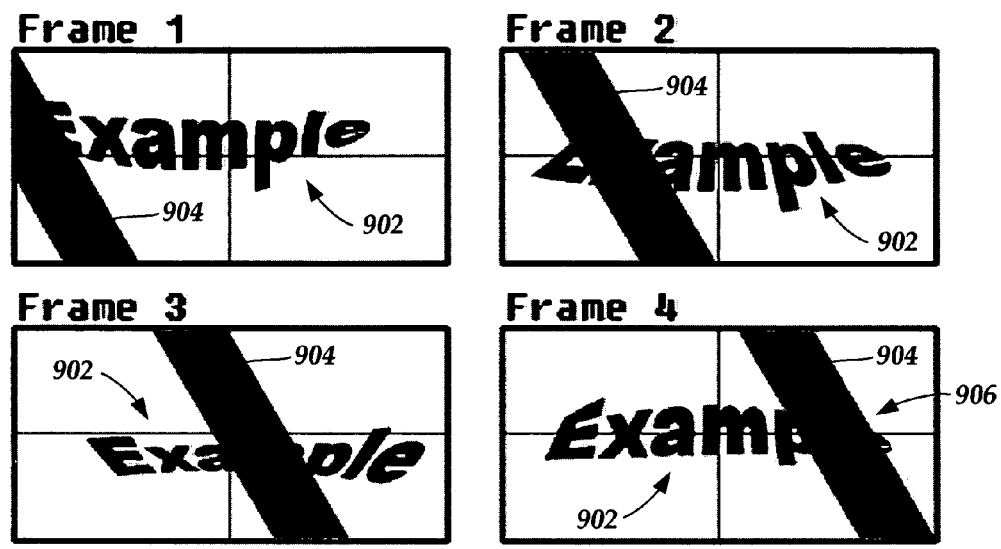
FIG. 9 shows four frames of an illustrative identification test captured over a period of time, with a transient character feature in accordance with some embodiments of systems and methods discussed herein.

In some embodiments, one or more transient characters may appear in a challenge graphic for a duration of time that is shorter than the duration of an identification test. FIG. 9 shows four frames of an illustrative identification test captured over a period of time, each of the frames including a challenge character set 902 partially obscured by a moving bar 904. One of the frames includes a transient character 906 (e.g., "F") overlaid onto the moving bar 904 in line with the challenge character set 902.

In some embodiments, the transient character 906 may appear for a duration of time that is shorter than the duration of time for which characters of the challenge character set 902 are displayed. For example, the transient character 906 may appear for a duration of time that is long enough for a software robot to recognize, but not long enough for a human user to recognize. Additionally, or alternatively, the transient character 906 may be visually distinct from the challenge character set 902 due to timing, appearance, and/or location on the challenge graphic. These properties may enable a human user to recognize that the transient character 906 is not part of the challenge character set 902. However, it may be difficult for bots to distinguish the transient character 906 from characters in the challenge character set 902. As a result, the presence of the transient character 906 in a response may be an indication that the response has been generated by a bot, rather than a human user.

III. Techniques for Generating Challenge Graphics

Some illustrative techniques for generating challenge graphics for identification tests are discussed below in connection with FIGS. 10-14. One or more of these techniques may be implemented on one or more computers to generate challenge graphics such as those shown in FIGS. 3-9. In some embodiments, a challenge graphic generated using one or more of these techniques may be delivered via a web page and/or displayed by a web browser (e.g., as part of an identification test). However, it should be appreciated that these techniques are merely exemplary, and other techniques or combinations of techniques may also be suitable.

In some embodiments, an animated challenge graphic may include a series of frames, each of which may be generated by composing one or more layers of graphics. A static challenge graphic may be considered a special case of an animated challenge graphic, i.e., one that consists of only one frame (or multiple identical frames). An illustrative method for generating a frame is shown in FIG. 10.

Figure 10:
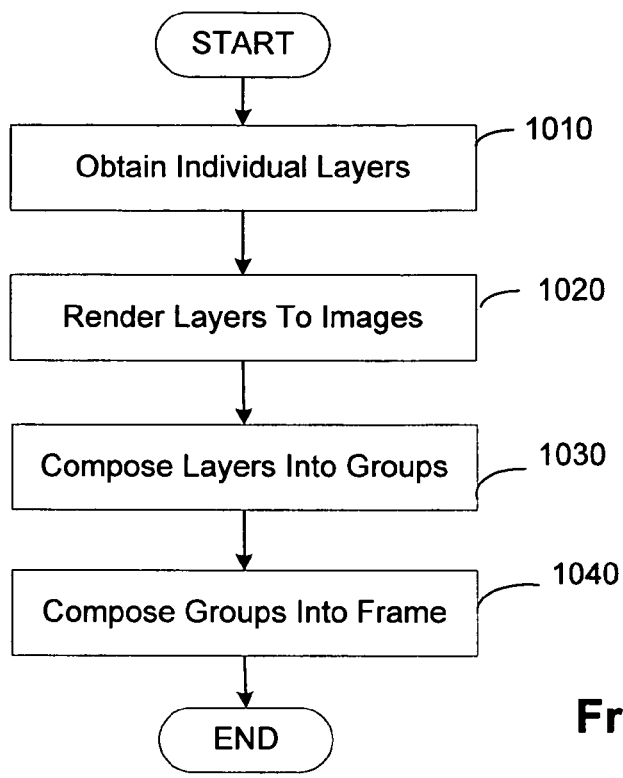
FIG. 10 shows an illustrative method for generating a frame of a challenge graphic, in accordance with some embodiments of systems and methods discussed herein.

In the embodiment shown in FIG. 10, individual layers of graphics are divided into one or more groups, and all of the layers within each group are rendered into a single image corresponding to the group. The groups thus obtained may then be composed to obtain a single frame. This grouping technique may enable application of certain blending techniques to entire groups of layers, for example, to enhance the quality of challenge graphics. However, it is not required that the individual layers be divided into groups. For example, the individual layers may be rendered directly into a frame, without being divided into groups.

In act 1010, one or more individual layers of graphics are obtained in one or more suitable manners. For example, some layers may be retrieved from a computer-readable data storage and loaded into computer memory, while other layers may be created dynamically. As discussed above, each layer of graphics may be static or animated, and may include any suitable combination of characters and/or non-character features. Illustrative methods for generating individual layers are discussed in greater detail below in connection with FIGS. 12-14.

In act 1020, each individual layer obtained in act 1010 is rendered to an image. Any suitable rendering techniques may be employed to render layers to images, such as those provided by the Open Graphics Library (OpenGL).

In act 1030, an image is created for each group by composing a group from the images obtained in act 1020 for the individual layers. An illustrative method for composing images is shown in FIG. 11, although other suitable methods may also be used.

In act 1040, the images obtained in act 1030 corresponding respectively to the different groups are composed to form a single image, which may be used as a frame in a challenge graphic. Again, any suitable method for composing images may be used, such as the one illustrated in FIG. 11.

Figure 11:
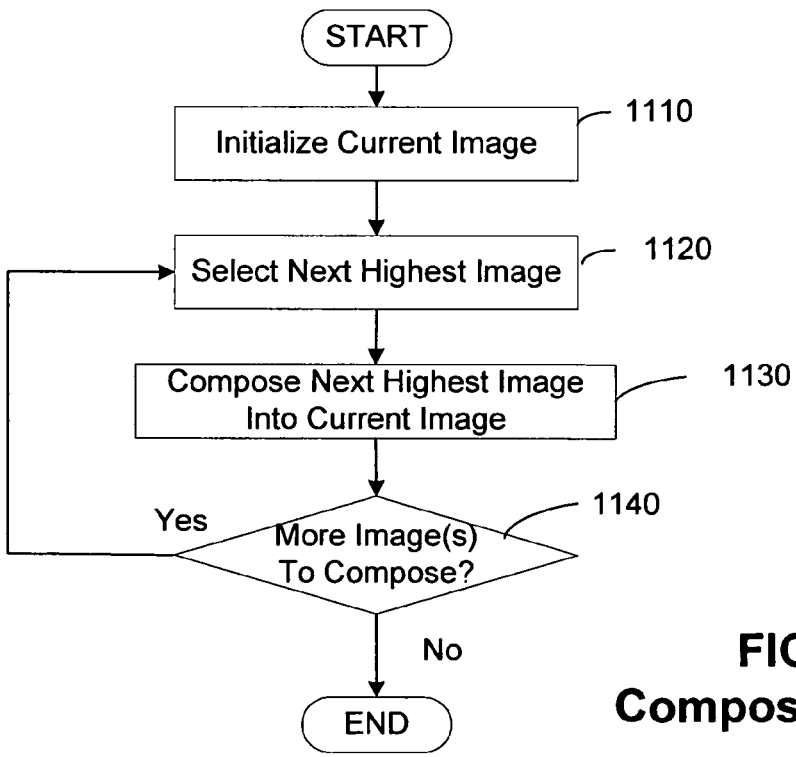
FIG. 11 shows an illustrative method for composing multiple images into a single image, in accordance with some embodiments of systems and methods discussed herein.

In the embodiment shown in FIG. 11, the images to be composed are arranged in a desired order (e.g., back-to-front). In act 1110, a current image is initialized, for example, by creating or loading a default image. The default image may have a single pre-defined color (e.g., black). In act 1120, a next highest image to be composed is selected and, in act 1130, the selected next highest image is composed into the current image to form a new current image. Then, in act 1140, it is determined whether at least one more image is to be composed into the current image. If yes, the process returns to act 1120 to select a new next highest image, otherwise, the process ends and the current image is returned as the result of the composition.

The inventor has appreciated that, in some embodiments, it may be desirable to provide challenge graphics that are of higher visual quality than in conventional identification tests. This may be desirable, for example, where identification tests are used as a marketing vehicle by incorporating marketing contents into challenge graphics.

In some embodiments, challenge graphics of high visual quality may be generated by applying various blending techniques as multiple images are composed to form a single image (e.g., when individual layers are composed into a group in act 1030 of FIG. 10 and/or when groups are composed into a frame in act 1040 of FIG. 10). For example, a top image (e.g., a next highest image as discussed in connection with FIG. 10) may be composed into a background image (e.g., a current image as discussed in connection with FIG. 10) with transparency and translucency. Other more complex techniques may also be used, such as using a top image as a mask to modify a background image (e.g., to darken or lighten the background image). As another example, lighting information may be applied to a top image to achieve shadowing effects in a background image as a result of the composition. This technique may be employed to improve efficiency of the rendering process, by removing the need to inject shadow geometry and to render shadows fully in 3D.

These and many other techniques may be employed to improve the visual quality of challenge graphics. However, it should be appreciated that such techniques are merely illustrative and are not required.

In some embodiments, each layer is modeled as a mesh, which is a list of vertices and surfaces that represent a complex shape. A mesh may be described in two dimensions (2D), three dimensions (3D), or even higher dimensions. In some embodiments, meshes are employed to allow for increased diversity in the rendering of a frame. For example, a layer modeled as a 3D mesh may have variable depth (e.g., some features in the layer may appear deeper into the scene than other features).

Figure 12:
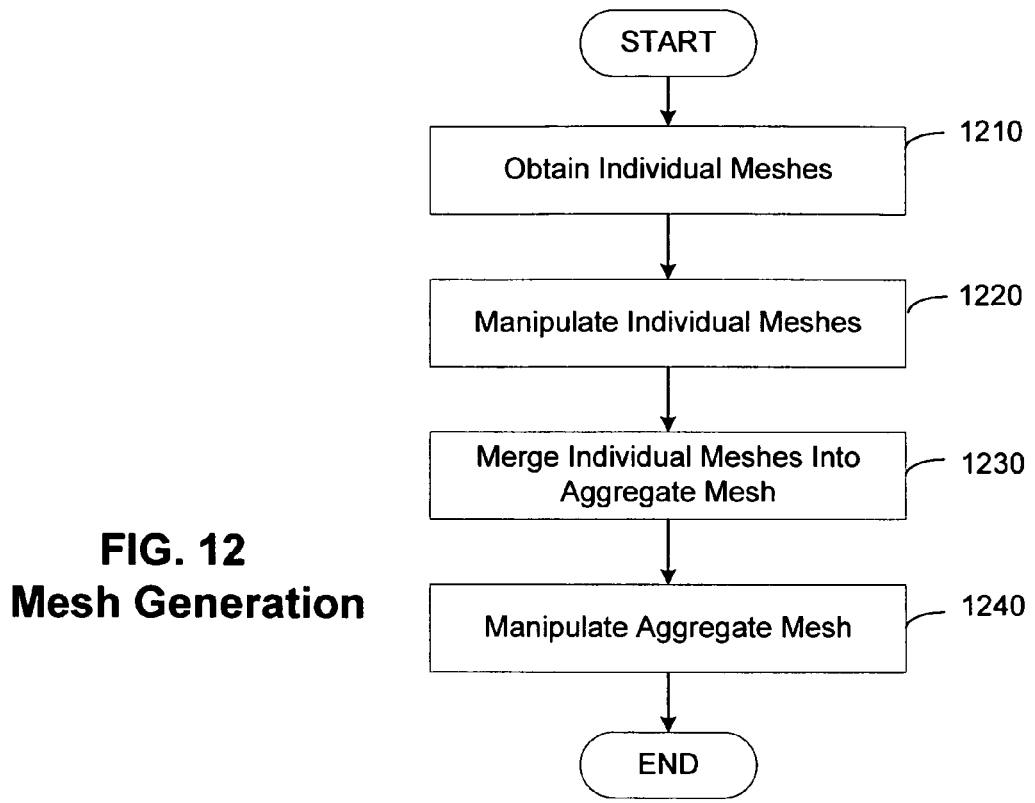
FIG. 12 shows an illustrative method for generating and/or manipulating character meshes, in accordance with some embodiments of systems and methods discussed herein.
Figure 13:
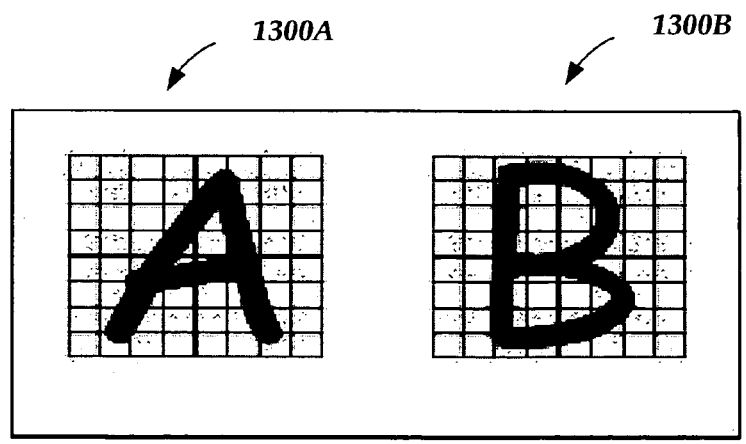
FIG. 13 shows an example of two character meshes, in accordance with some embodiments of systems and methods discussed herein.

FIG. 12 shows an illustrative method by which a mesh corresponding to one layer may be generated. In act 1210, one or more individual meshes may be obtained in one or more suitable manners. For example, when used herein, a mesh may be generated dynamically and/or algorithmically, or it may be retrieved from a data storage and loaded into memory. In some embodiments, a mesh corresponding to one or more characters may be generated dynamically based on a two-dimensional (2D) image of the one or more characters in a 2D font. Optionally, the 2D image may be manipulated using conventional techniques before it is used to generate a mesh. FIG. 13 shows an example of two character meshes, 1300A and 1300B, each generated based on a 2D font. Although not show, a mesh corresponding to one or more characters may alternatively be generated based on a suitable representation of the characters in a 3D font.

Figure 14:
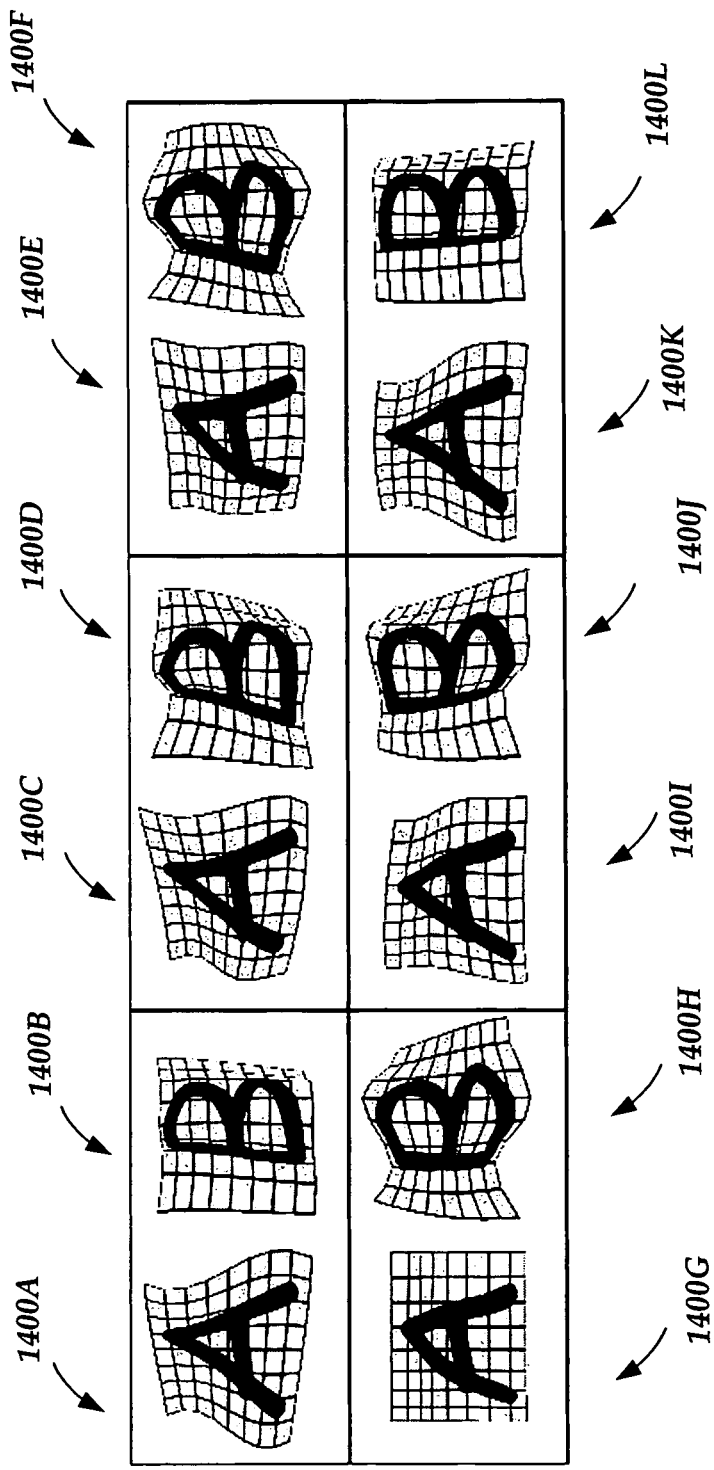
FIG. 14 shows examples of different warping effects (or, equivalently, a same effect varied over time) applied to the character meshes of FIG. 13, in accordance with some embodiments of systems and methods discussed herein.

Returning to FIG. 12, any number of the individual meshes obtained in act 1210 may be manipulated in act 1220. Manipulations of meshes may be performed manually, algorithmically, and/or by applying one or more stored transformations that may or may not be time-varying. Additionally, different individual meshes may be manipulated using the same or different techniques, some of which may be designed to make it more difficult for a bot to recognize characters in a challenge character set of an identification test. FIG. 14 shows some examples of character meshes 1400A-L, obtained by manipulating the character meshes 1300A and 1300B shown in FIG. 13 to achieve different warping effects.

Returning again to FIG. 12, the individual meshes, after they have been manipulated in act 1220, are merged into an aggregate mesh in act 1230. The process of merging may include determining the orientation of each feature represented by an individual mesh and/or the relative positions of features represented by different individual meshes. The resulting aggregate mesh may be used as a finished model of a layer, or it may be further manipulated in act 1240 to obtain a finished model of a layer.

It should be appreciated that the mesh-based techniques described above are merely exemplary. Other techniques may also be used for modeling, manipulating, and/or rendering a challenge graphic, instead of, or in addition to, mesh-based techniques. For example, a particle system may be used. A particle system may be particularly useful for creating certain visual effects (e.g., explosions, fire, water droplets, and/or sparks). Additionally, when a particle system is used, meshes may be generated dynamically as particles are created or destroyed (e.g., on a frame-by-frame basis).

IV. Incorporating Content Into Identification Tests

Conventionally, identification tests are implemented for security purposes, for example, for distinguishing access requests originating from human users from those originating from bots. To increase security, conventional identification tests such as some conventional captchas use contents that are either randomly generated or randomly selected from a large pool of pre-existing contents, such as books.

The inventor has appreciated that identification tests may be implemented in many different ways and for many different purposes, other than those conventionally envisioned. For example, identification tests may be used as a means of distributing user-generated content. In some embodiments, a web site may be provided to enable web users to submit content to be incorporated into an identification test. The content may be of any suitable format, such as a textual message, a static image, a video clip, and/or an audio clip. Also, the content may be distributed for any suitable purpose, for example, as part of a political or non-political public campaign or for marketing goods or services.

The term "marketing content" is used herein to refer generally to any content to be distributed, regardless of the nature of the content. Examples of marketing content include advertisements relating to one or more products and/or services offered by a sponsoring entity, which may pay a fee in exchange for the delivery of the advertisements via identification tests. However, it should be appreciated that payments may not be required, and that if payments are required for at least some users, any suitable payment structure may be imposed.

Marketing content may be incorporated into an identification test in a number of different ways, including those discussed below. For example, graphical marketing content, which may or may not include characters, may be incorporated as one or more features in one or more layers in a challenge graphic of an identification test. Examples of graphical marketing content include logos, product images and/or any messages embodied in images. The graphical marketing content, as well as the layers into which it is incorporated, may each be static or animated. When animated, the graphical marketing content may appear, disappear, or otherwise change in appearance in any suitable way during the administration of an identification test. Additionally, graphical marketing content may be used as clutter features which, as discussed above, partially obscure a challenge character set to make it more difficult for a bot to recognize the challenge character set. For example, the substantially horizontal line that vertically bifurcates the challenge character set shown in FIG. 7A may be replaced by a chain of logos and/or product images.

As another example, textual marketing content may be incorporated into a challenge character set of an identification test. The textual content may include any message such as a product or service name, a product or service description, a marketing slogan and/or any message that a user wishes to convey via identification tests. As discussed above, characters and/or words other than those of the message may also be included, to decrease the likelihood that a bot succeeds in the identification test by guessing a marketing message. For example, randomly selected characters may be added to a marketing message "I love cola" to obtain a challenge character set such as "I love cola z1lk" or "I z1lk love cola." Alternatively, or additionally, randomly selected words (e.g., from a dictionary or some other suitable collection of words) may be added to the marketing message to obtain a challenge character set, such as "I love soda super," or "I really love soda."

As yet another example, audio marketing content may be incorporated in one or more audio signals associated with an identification test, to deliver any message that a user wishes to convey via identification tests.

Marketing content to be incorporated into an identification test may be obtained in any suitable way. For example, it may be provided directly by a user (who may or may not represent a sponsoring entity), or it may be generated dynamically based on information provided by the user. Also, the same or related marketing content may be incorporated into multiple different identification tests.

V. Storage and Selection of Identification Tests

In some embodiments, identification tests may be generated as they are needed (e.g., when a user requests access to one or more resources). In other embodiments, identification tests may be generated in advance and stored in a data storage. This latter approach may be beneficial when an identification test includes sophisticated graphics that are computationally expensive to generate. That is, generating challenge graphics in advance may maximize processor usage by spreading the computation load consistently through at least a portion of a day.

The data storage for identification tests may be configured in a manner that facilitates efficient retrieval and/or other additional functionalities. For example, the identification tests may be stored in "pools" or "buckets" according to one or more attributes, e.g., a level of difficulty. Alternatively, or additionally, each identification test may be stored in association with some suitable metadata, such as a date range during which the identification test may be administered, a maximum number of times the identification test may be administered, and/or a marketing campaign to which the identification test belongs.

The data storage may also be reconfigured and/or updated dynamically. For example, an identification test may be moved from one bucket to another, or even entirely removed from the data storage. These changes may be made based on any relevant information, such as the age of the identification test, the number of times the identification test has been administered, feedback from users and/or sponsoring entities, and/or results of recently administered identification tests. For example, an identification test may be associated with an expiry date (e.g., the end of a promotional campaign), after which the identification test is removed from the data storage. As another example, an identification test may be removed or re-classified if it is determined to be easy for a bot to solve and/or difficult for a human user to solve. This information may be obtained in any suitable way, for example, by analyzing results of past administrations of the identification test.

When they are needed, identification tests may be retrieved from the data storage in one or more suitable manners. In some embodiments, a bucket of identification tests may be chosen based on some relevant information, and an identification test is selected at random from the chosen bucket. For example, identification tests may be organized into buckets according to difficulty levels, and a suitable bucket may be chosen by specifying a desired level of difficulty. As another example, identification tests may be organized into buckets according to marketing campaigns, and a suitable bucket may be chosen by specifying a desired marketing campaign. Alternatively, or additionally, an identification test may be chosen by issuing a database query and matching the query against the metadata of the identification tests. Such a database query may be generated in any suitable way using any suitable combination of information.

In some embodiments, the selection of identification tests may depend on a service agreement between a sponsoring entity and an entity that provides the identification tests. For example, the service agreement may specify a service tier corresponding to a frequency or range of frequencies at which identification tests associated with the sponsoring entity are to be administered. Different service tiers corresponding to different frequencies may be sponsored at different cost levels. As another example, a sponsoring entity may specify in the service agreement one or more to classes of publishers and/or users, so that identification tests sponsored by the sponsoring entity are administered only during transactions involving the specified publishers and/or users.

In some embodiments, the selection of identification tests may depend on a service agreement between a publisher that requests identification tests and an entity that provides identification tests. A publisher may request that one or more classes of identification tests not be administered to users requesting access to the publisher's resources. Alternatively, or additionally, a publisher may request that one or more classes of identification tests be the only identification tests administered to users requesting access to the publisher's resources. Other types of preferences may also be specified.

VI. Other Functionalities

In some embodiments, one or more measures may be taken to control the quality of the marketing contents incorporated into identification tests. This may be beneficial when at least some of the marketing contents are submitted through a web page with little or no moderation. For example, slogans that are believed to be obscene and/or offensive may be removed from use as soon as they are discovered to be obscene and/or offensive. This may be achieved by providing a user interface element (e.g., an "OFFENSIVE" button) with the identification test to allow a user to identify potentially offensive marketing content. Additionally, the user may be provided with the option to receive a substitute identification test.

In some embodiments, a user interface element (e.g., a "HARD TO READ" button) may be provided with an identification test to allow a user to identify an identification test that the user finds too difficult to solve. The user may also be provided with the option to receive a substitute identification test that is less difficult.

Many other features may also be implemented to improve security, user experience, marketing effectiveness and/or other service qualities. Below is a non-exhaustive list of exemplary features that may be implemented in any suitable combination.

1) A user may be allowed to rank two or more marketing contents.
2) A mobile-specific identification test format for advertisements may be employed for users of mobile devices.
3) One or more advertisements may pop-up upon (or subsequent to) a successful response to an identification test.
4) A rewards program may be available to a user upon the successful completion of a predetermined number of identification tests.
5) An identification test may include an "AUDIO" button which a user may activate to hear a correct or expected response.
6) An identification test may include a "TEXT MESSAGE" button which a user may activate to receive a text message of a correct response. A user may enter an identifier of an electronic device, such as a mobile phone number, to which the text message with the correct response may be sent.
7) The placement of a user response field may appear in various locations around a challenge graphic of an identification test.
8) A user response field may appear for an amount of time that is less than the full duration of the identification test.

VII. Examples of System Implementations

Conventionally, two types of system architectures, in-house and third-party, have been used for implementing identification tests. In an in-house architecture, an identification test (e.g., a captcha) is generated, served, and validated in a single computer or system. For example, when a user attempts to load a web page from a publisher, the web server of the publisher generates a captcha image, serves the captcha to the user, and validates the user's response. By contrast, in a third-party architecture, a publisher uses a third-party system to generate identification tests to be served to users. In some instances, the third-party system is also used to validate responses received from the users.

The inventor has appreciated that conventional systems for implementing identification tests (both in-house and third-party) may be limited in several aspects. For example, they implement identification tests on a per-transaction basis only. There is no tracking and/or correlation of identification tests administered during different transactions (e.g., transactions associated with a same user throughout a certain time period), nor any form of dynamic feedback (e.g., selecting a more or less difficult identification test to be served to a user based on history information accumulated for the user during earlier transactions). Additionally, there is no sharing or aggregating of identification test information across multiple publishers that each operate their own in-house identification test system. As a result, valuable information regarding users and their behaviors may not be recorded and utilized to the fullest extent possible. For example, a bot attack may be more readily detectable by examining the total number of new accounts opened by the same user with multiple different publishers during a certain time period. However, there are no conventional techniques for collecting this type of information.

In some embodiments, improved systems and methods are provided for implementing identification tests to enable tracking of identification test information. Such an improved system may include one or more servers which, in cooperation with one or more computer systems run by a user, administer an identification test to the user. Additionally, the one or more servers may be operated by a third-party entity, and may administer the identification test at the request of a publisher and/or in cooperation with one or more systems run by the publisher. However, it should be appreciated that a third-party architecture is not required, as any of the functionalities provided by a third-party system may alternatively be provided by an in-house system.

VII.A. Third-Party Architecture

Figure 15:
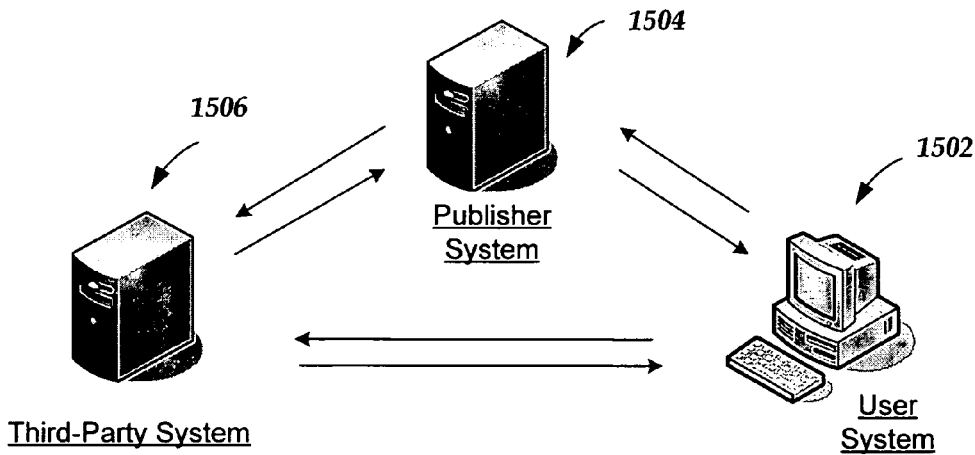
FIG. 15 illustrates an example of a third-party system for implementing identification tests, in accordance with some embodiments of systems and methods discussed herein.

FIG. 15 illustrates an example of a third-party system 1506 for implementing identification tests in accordance with some embodiments. The third-party system 1506 may include one or more servers adapted to communicate with a publisher system 1504 and/or a user system 1502. The publisher system 1504 may include one or more servers adapted to communicate with the third-party system 1506 and to engage in one or more transactions with the user system 1502. For example, the user system 1502 may initiate a transaction with the publisher system 1504 to gain access to one or more resources (e.g., web pages and/or new email accounts) provided by the publisher system 1504.

In some embodiments, the user system 1502 may include one or more computers adapted to communicate with the publisher system 1504 and/or the third-party system 1506. The one or more computers may be operated by a human user and/or a bot.

Figure 16:
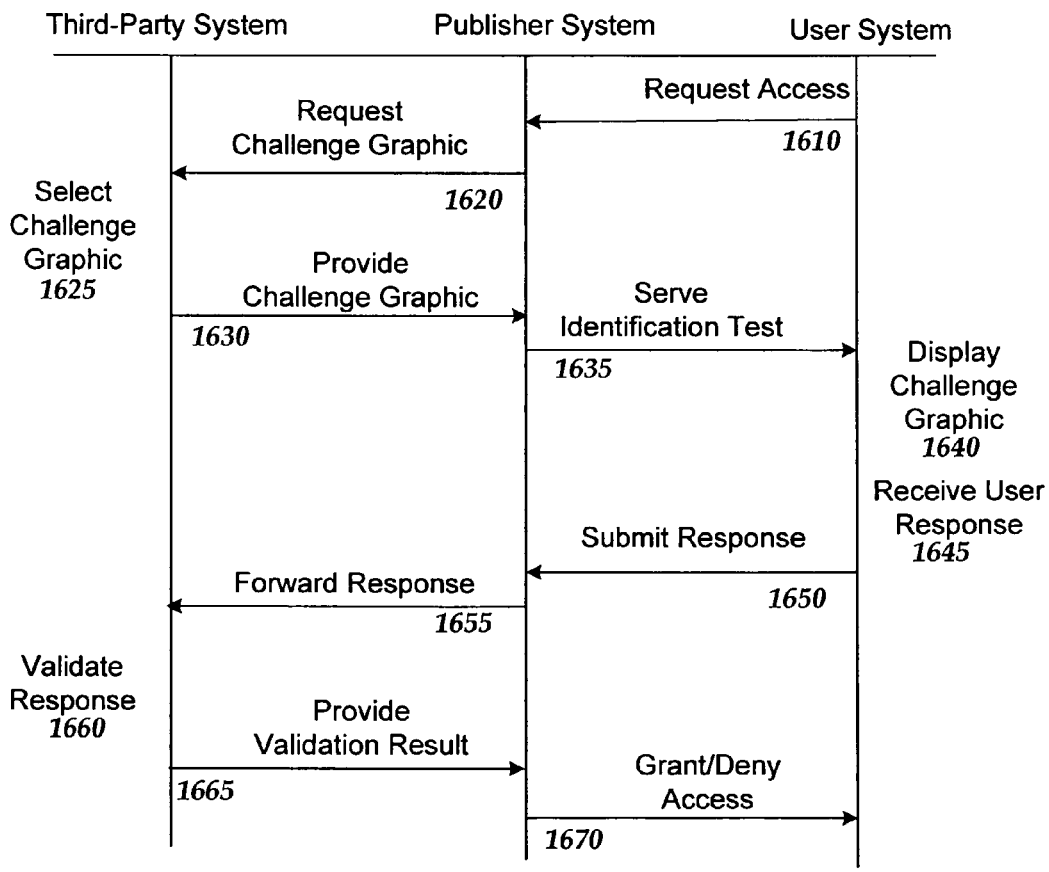
FIG. 16 illustrates a first example of a protocol that may be executed collectively by a user system, a publisher system and a third-party system, in accordance with some embodiments of systems and methods discussed herein.

FIG. 16 illustrates an example of a protocol that may be executed collectively by a user system, a publisher system and a third-party system. In this example, a challenge graphic is requested and provided for use in an image-based identification test. However, it should be appreciated that other types of identification tests may also be employed. For instance, in some embodiments, a challenge audio may be provided for use in a sound-based identification test.

In act 1610, the user system transmits to the publisher system a request for permission to perform an action, such as accessing one or more resources. In response to the access request, the publisher system may determine that an identification test is to be administered to the user before the user may proceed with the action. In act 1620, the publisher system submits to the third-party system a request for a challenge graphic for use in an identification test to be served to the user.

In act 1625, the third-party system selects a challenge graphic from a pre-generated collection of challenge graphics (or, alternatively, generates a challenge message upon receiving the request for a challenge graphic in act 1620) and transmits the selected challenge graphic to the publisher system in act 1630. Based on the received challenge graphic, the publisher system serves an identification test to the user in act 1635. Upon receiving the identification test, the user system displays the challenge graphic in act 1640 via a suitable output device (e.g., a monitor or a screen of an electronic device) and receives a response in act 1645 via a suitable input device (e.g., a keyboard) from a human user. Alternatively, in some embodiments (e.g., where the user represents a bot), acts 1640 and 1645 may be replaced by an automated analysis of the challenge graphic that produces a response to the identification test.

In act 1650, the user system submits the response to the publisher system, which in turn forwards the response to the third-party system in act 1655. In act 1660, the third-party system evaluates the response forwarded by the publisher system (e.g., to determine whether the response is valid) and provides an appropriate evaluation result to the publisher system in act 1665. Based on the evaluation result, the publisher system determines in act 1670 whether to grant or deny the user's request to access the resources.

It should be appreciated that the sequence of communications shown in FIG. 16 may be modified and/or augmented in various ways. For example, additional information may be exchanged in various acts of communications described above for one or more different purposes, such as increasing security and/or enabling enhanced functionalities. Examples of enhanced functionalities may include tracking of identification test results and/or intelligent selection of challenge graphics.

VII.B. Token-Based Transaction

In some embodiments, the request for a challenge graphic submitted in act 1620 may be preceded by another round of communications, in which a token (e.g., a small text file, such as a so-called "cookie") associated with the present transaction is created by the third-party system and transmitted to the publisher system. The token may be passed from the publisher system to the user system, so that the user system (instead of the publisher system) may request a challenge graphic by submitting the token. This mechanism may ensure that challenge graphics are provided only to a user to whom a publisher wishes to administer an identification test.

Utilizing tokens may also enable early error detection. In some embodiments, an error may be detected when the publisher system requests a token from the third-party system but receives no response. Thus, the publisher system may determine that the third-party system is inoperative and may stop serving identification test requests to avoid the risk of system overloading.

Figure 17:
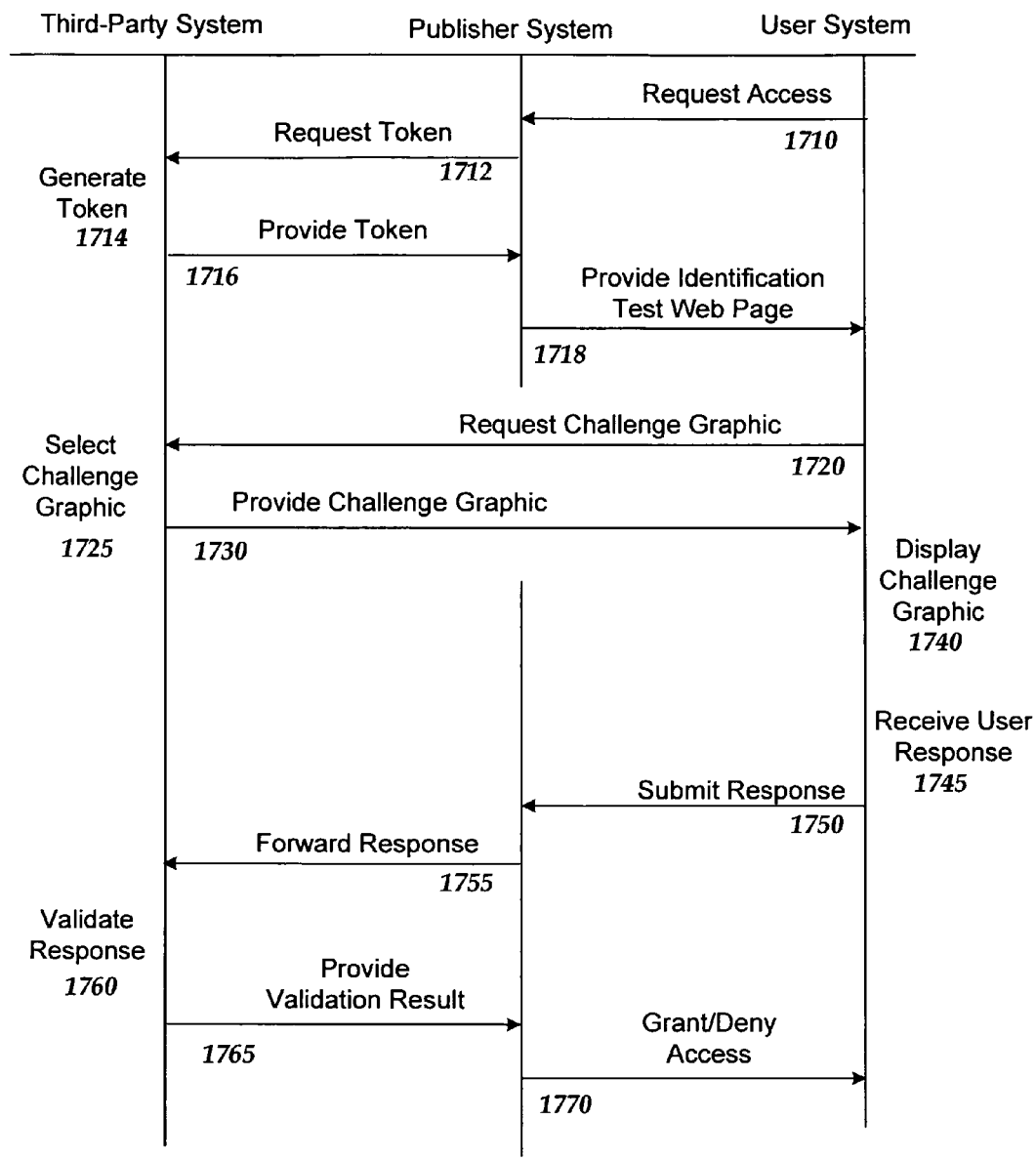
FIG. 17 illustrates a second example of a protocol that may be executed collectively by a user system, a publisher system and a third-party system, in accordance with some embodiments of systems and methods discussed herein.

FIG. 17 shows an illustrative protocol that uses tokens to distribute information. As in the example of FIG. 16, the protocol of FIG. 17 begins when a user initiates a transaction with a publisher (e.g., by requesting access to one or more resources in act 1710). Upon receiving the access request, the publisher system determines that an identification test is to be administered to the user and submits a token request to the third-party system in act 1712.

As discussed above, the token request may contain any suitable combination of information that may be used in achieving any suitable functionality. For example, the token request may contain authentication information, such as a signature generated using the publisher system's private key, that allows the third-party system to ascertain that the token request has originated from a legitimate publisher. This may prevent attackers from obtaining and analyzing a sufficiently large number of challenge graphics in advance. As another example, the token request may contain an identifier for the transaction initiated by the user and/or information regarding the nature of the transaction (e.g., loading a web page, posting a comment to a discussion board, and/or opening a new account). As discussed in greater detail below in connection with FIGS. 22 and 23, this information may be used to estimate a level of risk associated with the transaction.

Below is a list of different types of information that may be included in a token request. It should be appreciated that this list is merely illustrative, as other types of information may also be included, instead of, or in addition to, the types listed below, and less than all of this information may be included. Additionally, all or parts of the information contained in the token request may be encrypted, for example, using a secret key shared between the publisher system and the third-party system, or using a public key of the third-party system.

1) TIME_TREQ: A timestamp of when the token request is created. This may be used to prevent replay attacks (e.g., an attacker intercepting a token request from a legitimate publisher and submitting it at a later time to obtain a token illegitimately). In some embodiments, the timestamp may also be used as part of a time-out mechanism, where the third-party system responds only to token requests issued relatively recently (e.g., within a predetermined time period).
2) SKEY: A unique cryptographic key associated with the present transaction. This may be a secret key generated according to a symmetric key encryption algorithm and may be used to encrypt some or all of the information exchanged between the publisher and the third-party.
3) USERDATA: This may be any custom-defined data that the publisher chooses to include in the token request. For example, it may be an identifier for the user within the publisher's internal systems.
4) SESID: A session identifier associated with the present transactions. USERDATA, SESID and/or some other suitable information may be used to identify the present transaction in subsequent communications between the third-party system and the publisher system. For example, the third-party system may notify the publisher system at a later time that the transaction associated with USERDATA and/or SSID has been determined to be part of an attack.
5) URI: A universal resource identifier (URI) identifying a resource that the user is attempting to access (e.g., a web page that the user is attempting to load). As discussed in greater detail below, this information may be used to select a suitable challenge graphic.
6) TYPE: An indication of the type of resource that the user is attempting to access (e.g., opening a new account and/or posting a comment). This may be used to determine a level of risk associated with the present transaction and/to select a suitable challenge graphic.
7) KUSER: An indication of whether the user is known to the publisher system and/or third-party system (e.g., whether the user has an existing account and/or is logged in to the publisher system). It should be appreciated that a known user need not be a trusted user.
8) IP: An Internet Protocol (IP) address of the user. In case the user system communicates with the publisher system via a proxy server, this may be the IP address of the proxy server.
9) XF: An X-Forward address of the user. This may be the "true" IP address of the user, as provided by a proxy server via which the user system communicates with the publisher system. IP and/or XF may be used as an identifier for the user by the third-party system.
10) UA: A user agent of the user. This may be any information regarding a computer program through which the user system communicates with the publisher system and/or the third-party system. For example, UA may include a name and version for a web browser of the user.
11) RF: A referrer of the user. This may be any information regarding the user's browsing history. For example, RF may indicate a referring web site via which the user arrives at a current web site.

In act 1714, the third-party system creates a token and returns it to the publisher system in act 1716, along with any other suitable information. The token may be created in any suitable way and may be used by the third party for any suitable purpose. In some embodiments, the token may serve as a unique identifier for the present transaction within the third-party system. Alternatively, or additionally, the token may be a collection of data that is decipherable only by the third-party system and may be used as a means of distributing information between different parts of the third-party system over an untrusted communication medium (e.g., via the publisher system and/or the user system). This may improve performance of the third-party system, for example, by enabling a server of the third-party system to complete a relevant portion of a transaction without contacting any other server in the third-party system. Additionally, the token may be replicated in various stages of a transaction, which creates a "built-in" redundancy that may improve reliability of the third-party system. For example, even when a server fails within the third-party system, another server may obtain from a token all information necessary for completing a relevant portion of a transaction.

Below is an illustrative list of different types of information that may be included in a token. It should be appreciated that other types of information may also be included, instead of, or in addition to, the types listed below. Additionally, as discussed above, all or parts of the information contained in the token may be encrypted so that it can be accessed only by the third-party system.

1) TIME_TOKEN: A timestamp of when the token is created. The timestamp may be used to determine whether the token has expired (i.e., whether the token has existed for more than a predetermined period of time). In some embodiments, a token is submitted with a request for a challenge graphic and a challenge graphic is provided only if the token has not expired.

2) SKEY: This may be the cryptographic key provided by the publisher system in the token request and may be used to encrypt parts or all of the information exchanged between the publisher system and the third-party system.

3) IP: An IP address of the user, as provided in the token request by the publisher system. This may be used by the third-party system to ascertain that a request for a challenge graphic indeed originates from the same user to whom the publisher intends to administer an identification test. For example, in some embodiments, a token is submitted with a request for a challenge graphic, and a challenge graphic is provided only if the request for a challenge graphic originates from the same IP address as specified in the token.

4) BID: An identifier for a bucket of challenge graphics from which a challenge graphic is to be retrieved and served to the user in the present transaction.

5) BIX: An index into the bucket BID, identifying a challenge graphic to be retrieved and served to the user in the present transaction.

6) RISK: An indication of the level and/or nature of the risk associated with the present transaction or user. This may be determined based on the IP address of the user, the type of the resource that the user is attempting to access, and/or any other suitable information. RISK may be used by various parts of the third-party system to influence the present transaction. For example, RISK may be used in selecting BID and/or BIX, which may correspond to a more or less difficult challenge graphic and/or a challenge graphic with clutter features that are more or less visible to bots than to human users. As another example, RISK may indicate a bandwidth requirement associated with the present transaction and may be used to determine an amount of data compression to be applied to a challenge graphic.

In addition to the token, a token response may contain other information that the third-party system wishes to convey to the publisher and/or the user. Again, all or parts of the information contained in the token response may be encrypted so that it is accessible only to one or more intended parties. Examples of information that may be contained in a token response include:

1) VSERV: An identifier for a validation server within the third-party system that may be used to validate a user response in the present transaction. VSERV may comprise an address (e.g., an IP address and/or a URI) at which the publisher system may connect to the validation server.

2) TRUST: An indication of a level of trust associated with the user, as determined by the third-party system using, for example, history information associated with the user. TRUST may be a numerical value, or any other custom-defined value.

3) WIDGET: HTML and/or JavaScript code or the like for displaying a challenge graphic.

4) SKIN: Data that may be used to customize the appearance and/or functionality of a player for displaying a challenge graphic. A player defines graphical content to be displayed along with the challenge graphic, such as additional controls (e.g., a refresh button for requesting a different challenge graphic) and/or a box around a video screen that displays the challenge graphic. The skin may be used to configure the player so that the player has a desired "look and feel" in accordance with a marketing campaign and/or a publisher's web site. The skin may be written as an XML data structure, for example.

5) DSERV: An identifier for a data server within the third-party system from which a challenge graphic may be requested. DSERV may comprise an address at which the publisher system and/or user system may connect to the data server.

Some or all of the information described above may be encrypted using SKEY (i.e., the cryptographic key provided by the publisher system in the token request) or some other suitable cryptographic key. For example, VSERV and TRUST may be encrypted using SKEY, while SKIN and DSERV may be unencrypted.

Upon receiving a token response from the third-party system, the publisher system provides an identification test web page to the user system in act 1718. For example, the publisher system may transmit to the user system HTML source having a widget for administering an identification test (e.g., for displaying a challenge graphic and/or receiving a user response). In some embodiments, the widget may specify failover behaviors to ensure that the challenge graphic is displayed properly regardless of web browser settings. Below is an illustrative pseudo code segment for a widget.

```
If (JavaScript enabled)
    If (Flash enabled)
        DisplayFlashPlayer( )
```

```
        Else
            DisplayJavascriptPlayer( )
        Else
            DisplayVideo( )
```

In this embodiment, if both JavaScript is enabled and an appropriate version of Flash is installed, then DisplayFlashPlayer( ) is invoked, which may construct a Flash player and display a challenge graphic in a high quality format, such as MP4. If JavaScript is enabled but Flash is not available, then DisplayJavascriptPlayer( ) is invoked, which may construct a JavaScript player and display a challenge graphic in a lower quality format, such as JPG animated through CSS (Cascading Style Sheets) Sprites. If JavaScript is not enabled, then DisplayVideo( ) is invoked, which may display a challenge graphic in animated GIF format, along with a text entry field constructed using standard HTML.

The information transmitted from the publisher system to the user system in act 1718 may also include a URI for obtaining a challenge graphic. In act 1720, the user system uses the URI to request a challenge graphic. As discussed above, the URI may identify a data server of the third-party system to which the user system may connect. Additionally, the URI may include information that the data server may use to select an appropriate challenge graphic. For example, the URI may include some or all of the information contained in the token or token request as discussed above. Additionally, the URI may specify a format in which the challenge graphic is to be returned (e.g., MP4 or GIF), and/or a refresh count indicating a number of times the user has activated a "refresh" button to request a different challenge graphic within the same transaction. In act 1725, the third-party system (e.g., a data server of the third-party system) selects challenge graphic based on information contained in the URI and returns a challenge graphic to the user system in act 1730 in an appropriate format (e.g., based on the user system's web browser settings, as discussed above). If a token is included as part of the URI, the third-party system may check the validity of the token (e.g., by decrypting the token and/or verifying a timestamp) before returning a challenge graphic.

Additionally, the third-party system may modify the manner in which the challenge graphic is returned using any suitable combination of information relating to the present transaction. In some embodiments, risk information (e.g. a RISK value as described above) is included in a token that is passed first from a token server of the third-party system to the publisher system in act 1716, then from the publisher system to the user system in act 1718, and eventually from the user system to a data server of the third-party system in act 1720. This mechanism may allow the data server of the third-party system to use the risk formation to determine how the challenge graphic is to be returned. For example, the challenge graphic may not be returned if the risk information indicates excessively high risk. Alternatively, the challenge graphic may be returned in a fashion that may sufficiently slow down a bot attack. For example, the challenge graphic may be returned only after a suitable delay, or it may be streamed in a very slow fashion.

In act 1740, the user system displays the challenge graphic received in act 1730 and receives a response in act 1745 from a human user. For example, the response may be a character string entered by the human user after viewing the challenge graphic. Alternatively, in some embodiments (e.g., where the user represents a bot), acts 1740 and 1745 may be replaced by an automated analysis of the challenge graphic that produces a response to the identification test.

In act 1750, the user system submits the response to the publisher system, which in turn forwards the response to the third-party system in act 1755 as part of a validation request. For example, the publisher system may submit the validation request to a validation server of the third-party system, as specified by the VSERV parameter in the token response transmitted to the publisher system in act 1716.

In addition to the response to be validated, the validation request may contain any suitable information that may be used by the third-party system in evaluating the response, such as TIME_TREQ, SESID, IP, XF, UA, and/or RF, as discussed above. This information may enable the third-party system to identify the present transaction and locate an expected response against which the received response is compared.

Any other information from the token request of act 1710 and/or the token response of act 1716 may also be included in the validation request. For example, the token itself may be included, to enable a validation server to make use of any risk information contained in the token (e.g., the RISK value as discussed above). In some embodiments, the expected response may be directly included in the token, so that the validation server may validate the received response without performing any lookups. Additionally, or alternatively, the token may include publisher information, so that the validation server may check that the publisher system issuing the validation request matches the publisher information contained in the token.

The third-party system evaluates a received response in act 1760. In some embodiments, different modes of evaluation may be employed depending on the value of RISK included in the token. For example, if RISK indicates a high level of trust (or, equivalently, a low level of risk), some errors in the response may be tolerated. That is, a response may be deemed valid even though it may contain some discrepancies from an expected response. On the other hand, if RISK indicates a high level of risk, then fewer or no errors may be tolerated. Some examples of errors that might be tolerated are listed below.

1) Doubling of a character or a missing character. For example, the actual response may be "spiice" or "spce," where the expected response is "spice."
2) Substitution of a correct character by an incorrect character that is located near the correct character on a keyboard. For example, the actual response may be "spoce," where the expected response is "spice."
3) Interchanging adjacent characters. For example, the actual response may be "spcie," where the expected response is "spice."
4) Interchanging adjacent words in a sentence.
5) Other common typographical errors.

In act 1765, the third-party server provides an appropriate evaluation result to the publisher system, which may contain any suitable information that the third-party system is programmed to convey to the publisher. For example, in addition to an evaluation result, a timestamp may be provided so that the publisher system may determine whether the present transaction has timed out.

In some embodiments, a binary result (e.g., "Valid" or "Not Valid") may be provided to indicate whether the user has passed or failed the identification test. In some other embodiments, the evaluation result may indicate an error has occurred and the identification test is inconclusive. An error code may also be provided to indicate the type and/or source of the error.

Additionally, or alternatively, the evaluation result may indicate a level of trust associated with the present transaction and/or with the user. This information may be used by the publisher system to determine an appropriate access privilege to be granted to the user in act 1770. For example, the publisher system may determine to grant restricted access when the trust level is low, even if the user passes the identification test. Any form of restricted access may be imposed. For example, in an embodiment in which the user wishes to post a comment, the publisher system may decide to moderate the comment, or otherwise inspect the comment using classification software such as a spam filter, before actually posting the comment.

Figure 18:
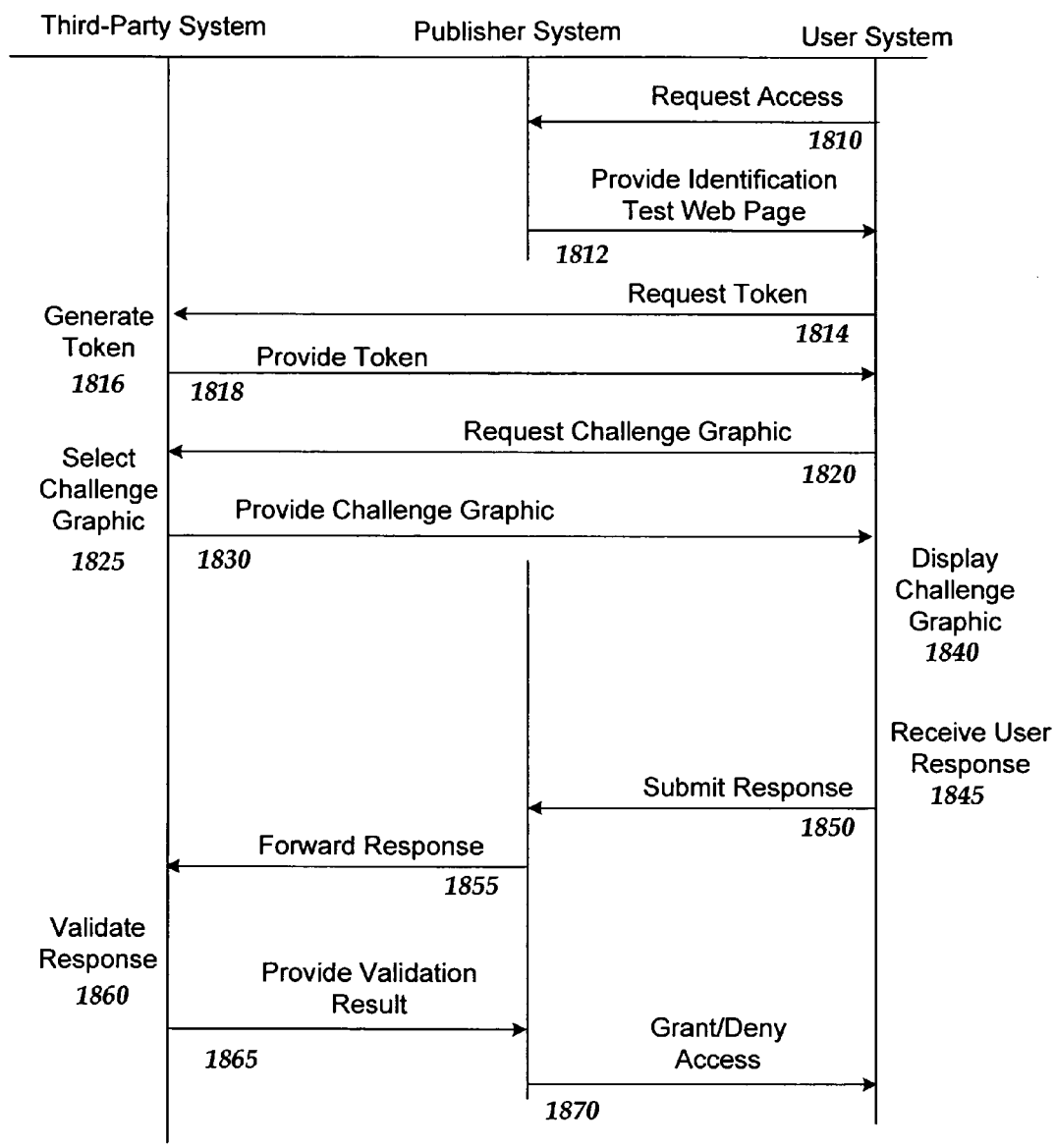
FIG. 18 illustrates a third example of a protocol that may be executed collectively by a user system, a publisher system and a third-party system, in accordance with some embodiments of systems and methods discussed herein.

It should be appreciated that the protocol described above in connection with FIG. 17 is merely illustrative, as other protocols may also be suitable. For example, the publisher system may push the overhead of connecting to the third-party system in act 1712 onto the user system. This may effectively distribute the workload relating to token requests from a relatively small number of publisher systems to a much larger number of user systems. FIG. 18 illustrates an example of a protocol adopting this strategy.

As in the example of FIG. 17, the protocol of FIG. 18 begins when a user initiates a transaction with a publisher (e.g., by requesting access to one or more resources in act 1810). Upon receiving the access request, the publisher system determines that an identification test is to be administered to the user and compiles a token request. Instead of submitting the token request to the third-party system as in act 1712, the publisher system proceeds in act 1812 to provides an identification test web page to the user system, where the token request is transmitted along with the HTML source. In some embodiments, the token request is encrypted using a public key of the third-party system or a pre-established key shared between the publisher system and the third-party system, and therefore security is not comprised by transmitting the token request to the user system.

In act 1814, the user system forwards the token request to the third-party system. In act 1816, the third-party system generates a token (e.g., as in act 1714) and transmit the token response to the user system in act 1818. Acts 1820-1870 then proceeds in a fashion similar to acts 1720-1770.

While FIG. 18 illustrates an example in which the request for a challenge graphic (act 1820) is preceded by a token request (act 1814) and its associated response (act 1818), it should be appreciated that the use of a token is not required. For example, the protocol shown in FIG. 18 may be modified to exclude acts 1814, 1816 and 1818, so that the user system proceeds directly to act 1820 to request a challenge graphic after receiving an identification test web page in act 1812.

VII.C. Servers and Clusters

Figure 19:
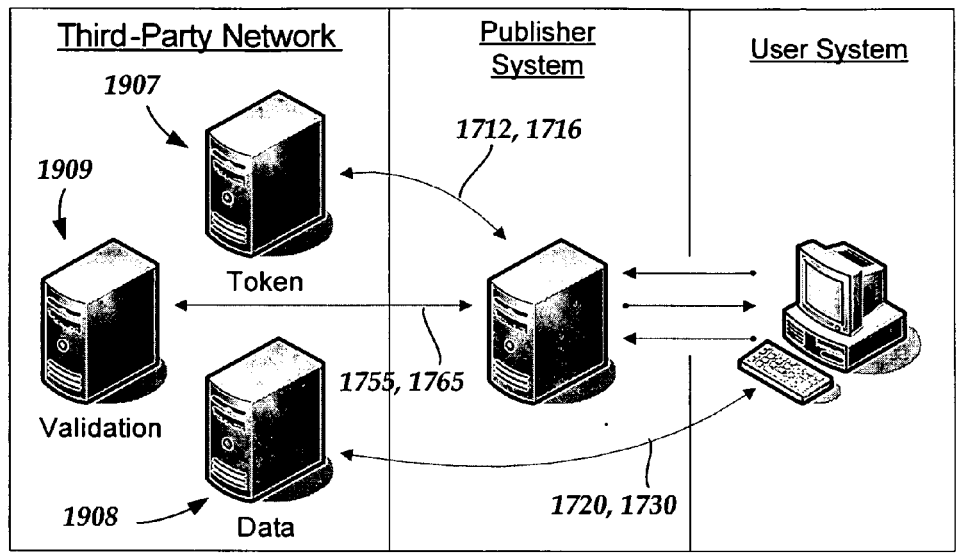
FIG. 19 illustrates an example of a third-party system comprising various servers for performing various tasks in implementing identification tests, in accordance with some embodiments of systems and methods discussed herein.

As discussed above, a third-party system may comprise one or more servers for performing various functionalities. FIG. 19 illustrates an example in which three servers, token server 1907, data server 1908 and validation server 1909, are used respectively for providing tokens, providing data (e.g., challenge graphics), and validating user responses. As shown in FIG. 19, activities relating to providing tokens (e.g., acts 1712 and 1716 of FIG. 17) may take place via the token server 1907, while those relating to providing data (e.g., acts 1720 and 1730 of FIG. 17) may take place via the data server 1908 and those relating to response validation (e.g., acts 1755 and 1765 of FIG. 17) may take place via the validation server 1909.

It should be appreciated that servers may be merely logical entities designated for certain activities or combinations of activities. Token server 1907, data server 1908 and validation server 1909 may in fact reside on the same physical machine or on any combination of machines running any combination of components. Additionally, the third party system may comprise servers other than token server 1907, data server 1908 and validation server 1909.

In some embodiments, token server 1907 comprises a number of servers each capable of receiving and responding to a token request. Similarly for data server 1908 and validation server 1909. These servers may be configured in any suitable manner. For example, they may be grouped into clusters based on geographical proximity and/or functionality.

Figure 20:
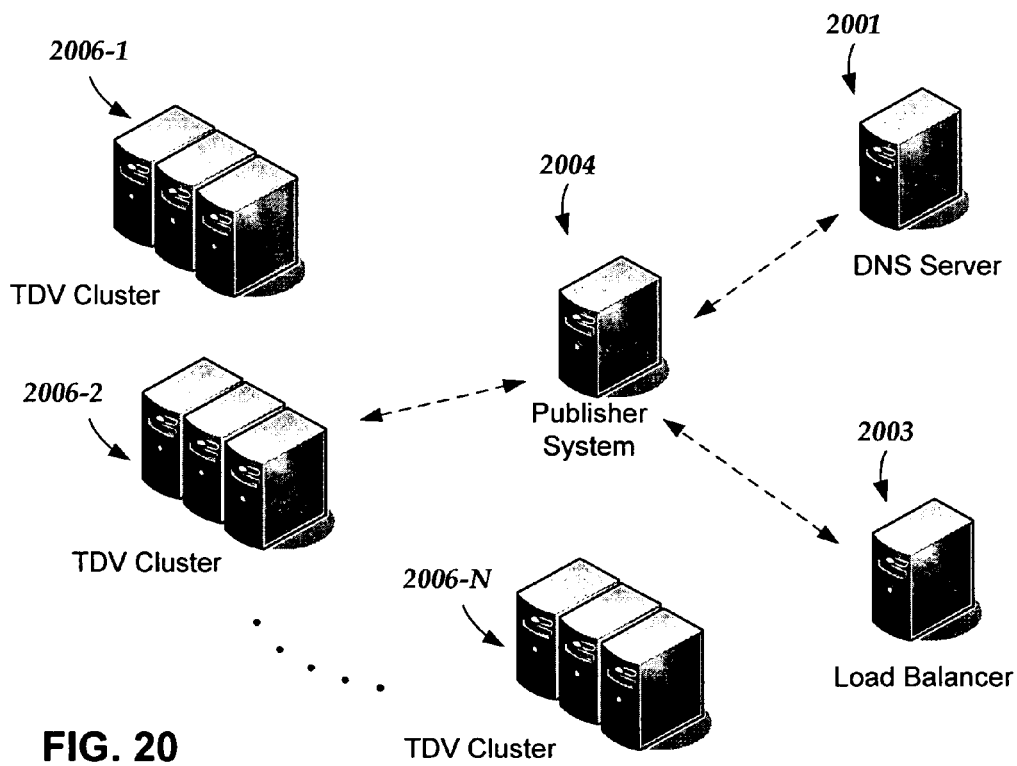
FIG. 20 illustrates an example of a third-party system comprising various server clusters for implementing identification tests, in accordance with some embodiments of systems and methods discussed herein.

In some embodiments, the servers may be grouped into a collection of Token-Data-Validation (TDV) clusters, where each cluster is capable of receiving and responding to token requests, data requests and validation requests. FIG. 20 illustrates an example in which a publisher system 2004 may contact each of N clusters (2006-1, ..., 2006-N) to carry out an identification test transaction.

Various techniques may be used for selecting a suitable TDV cluster to implement an identification test. In some embodiments, the publisher system 2004 may select a TDV cluster randomly or based on any traffic and/or load information available to the publisher system 2004.

In some embodiments, the publisher system 2004 may query a DNS server 2001 with a domain name and/or host name for the third-party system. The DNS server 2001 may return an IP address for a specific TDV cluster chosen based on any number of suitable factors, such as traffic and geography. For example, the DNS server 2001 may direct the publisher system 2004 to a geographically closest TDV cluster.

In some embodiments, the third-party system may include a custom load balancer 2003. The publisher system 2004 may contact the load balancer 2003, which may select a specific TDV cluster based on overall load conditions and transmit a host name and/or IP address of the selected TDV cluster to the publisher system 2004.

VII.D Advertisement Matching Service

As discussed above, information from one or more sponsoring entities may be incorporated into challenge graphics in accordance with some embodiments. For example, some challenge graphics may be associated with one or more marketing campaigns and may incorporate campaign information in one or more graphical or textual features, or in some other suitable manner.

In some embodiments, a challenge graphic may be selected for a given identification test transaction at least in part by selecting a marketing campaign based on information regarding the transaction. This may be done to improve the effectiveness of the marketing campaigns, to guarantee a level of service to a sponsoring entity, and/or to achieve other suitable goals.

In some embodiments, an advertisement matching service (AMS) may be used to select a marketing campaign for each identification test transaction. The AMS may be part of a system for implementing identification tests, or it may be external to the system.

Figure 21A:
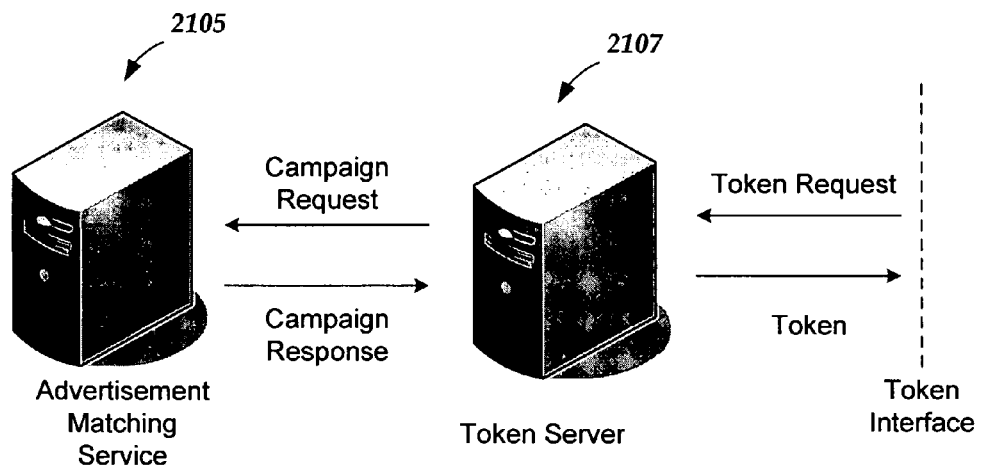
FIGS. 21A and 21B each show an illustrative configuration of an advertisement matching service for use in implementing identification tests, in accordance with some embodiments of systems and methods discussed herein.

In some embodiments, for example, as illustrated in FIG. 21A, an AMS 2105 may be invoked by a token server 2107 of a third-party system as part of a process for generating a token (e.g., act 1714 of FIG. 17). Upon receiving a token request via a token interface (e.g., from a publisher system or a user system), the token server 2107 may transmit a campaign request to the AMS 2105. The campaign request may include any suitable information regarding the present identification test transaction (e.g., any information included in the token request), to make the information available to the AMS for use in selecting a marketing campaign. As an example, a campaign request may include any combination of the following information.

1) PID: An identifier for a publisher who has requested the present identification test transaction.
2) URI: A URI of a resource to which a user wishes to gain access. For example, this may be a URI of a web page that a user wishes to view.
3) IP: An IP address of a user to whom an identification test is to be administered.

In some embodiments, the IP address of a user may be used as an indication of a geographic or logical location of the user (thus, the term "location" when used herein is intended to encompass both geographical and logical location alternatives unless context indicates otherwise). By examining IP addresses of users requesting challenge graphics for identification tests, a marketing campaign targeting a geographic area may be selected for those users whose IP addresses match the targeted geographical area. Additionally, or alternatively, a resource URI may be used as an indication of user interest. For example, if a user is attempting to view a web page related to vacationing, a marketing campaign for one or more travel destinations may be selected. As another example, if the web page indicates a particular destination, an airline campaign advertising air fairs relating to that destination may be selected. An IP address of a user may be used to provide even more focused advertising, such as advertising air fairs for traveling between the user's location as indicated by the IP address and a travel destination as indicated by a web page that the user is attempting to view.

A marketing campaign selected by the AMS 2105 may be returned to the token server 2107 via a campaign response, which may include a campaign identifier. The token server 2107 may use the campaign identifier to select a specific challenge graphic, for example, by determining a bucket identifier and an index into the bucket (as discussed above in connection with FIG. 17). The challenge graphic may be selected in any suitable way, for example, randomly within a campaign, or based on any suitable information available to the token server 2107. A token may then be generated accordingly and returned via the token interface.

Figure 21B:
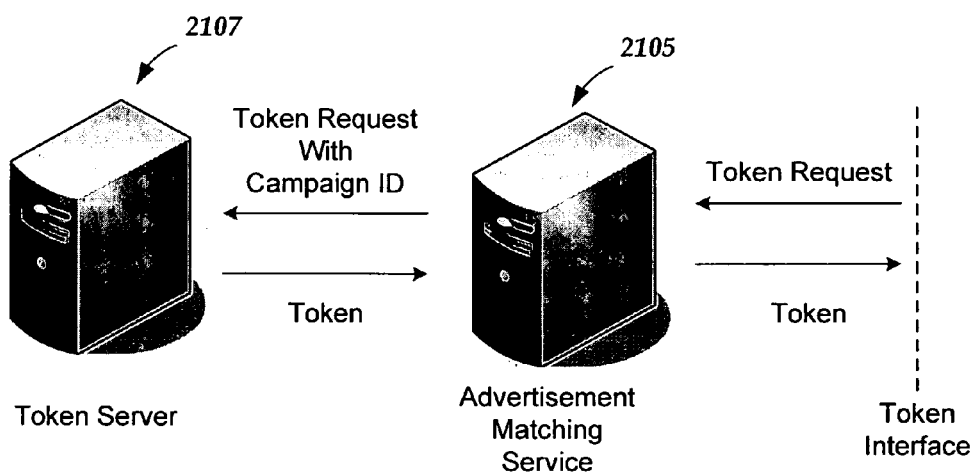

It should be appreciated that the arrangements illustrated in FIG. 21A is merely illustrative, as other arrangements may also be possible. In some embodiments (e.g., as illustrated in FIG. 21B), the AMS 2105 may be used as an interface for obtaining tokens, instead of the token server 2107. The AMS 2105 may receive a token request and use information contained therein to select a marketing campaign. Then the AMS 2105 issues a modified/augmented token request to the token server 2107, with an identifier for the selected marketing campaign. The token server 2107 may generate a token based on the campaign identifier and returns the token to the AMS 2105, which then forwards the token to an entity that has requested the token via the token interface (e.g., a publisher system or a user system).

VIII. Risk Assessment

In some conventional systems, identification tests are implemented in addition to password-based access control methods to increase security against bot attacks that guess passwords by brute force (i.e., repeatedly submitting a randomly selected password until a correct password is selected by chance). For example, if a user fails to input a correct combination of user name and password at a first attempt to log in to a system, the user is required to pass an identification test at a subsequent log-in attempt.

The inventor has appreciated that conventional risk assessment capabilities such as those described above are limited in several aspects. For example, the determination of risk is based on a very limited amount of information about a user (e.g., that the user entered an incorrect password at one attempt). Additionally, there is no accumulation of past identification results and hence no adaptive implementation of identification tests based on past identification test results.

In some embodiments, a risk assessment system is provided for assessing a security risk associated with an electronic transaction based on an identity of a user that takes part in the electronic transaction. For example, a level of security risk may be determined based on results of past identification tests administered to the user. Additionally, or alternatively, the level of security risk may be determined based on information regarding the present electronic transaction.

In some embodiments, a risk assessment system is provided as part of a third-party system that provides identification tests. This may enable the risk assessment system to access and make use of any combination of information available to the third-party system. Alternatively, the risk assessment system may be implemented separately as a stand-alone system, and may obtain transaction information from the third party system.

In some embodiments, a risk assessment system may perform risk assessment activities at the request of and/or in cooperation with a publisher system. For example, when a user requests access to one or more resources of the publisher, the publisher system may request the risk assessment system to determine a level of security risk associated with the access request. The publisher system may provide to the risk assessment system any combination of information available to the publisher to be used in determining the level of security risk.

In some embodiments, a result provided by a risk assessment system regarding an electronic transaction may influence a manner in which the electronic transaction proceeds. For example, a risk assessment result may be used to adjust a security parameter (e.g., a difficulty level) of an identification test that is administered in connection with the present electronic transaction.

Figure 22:
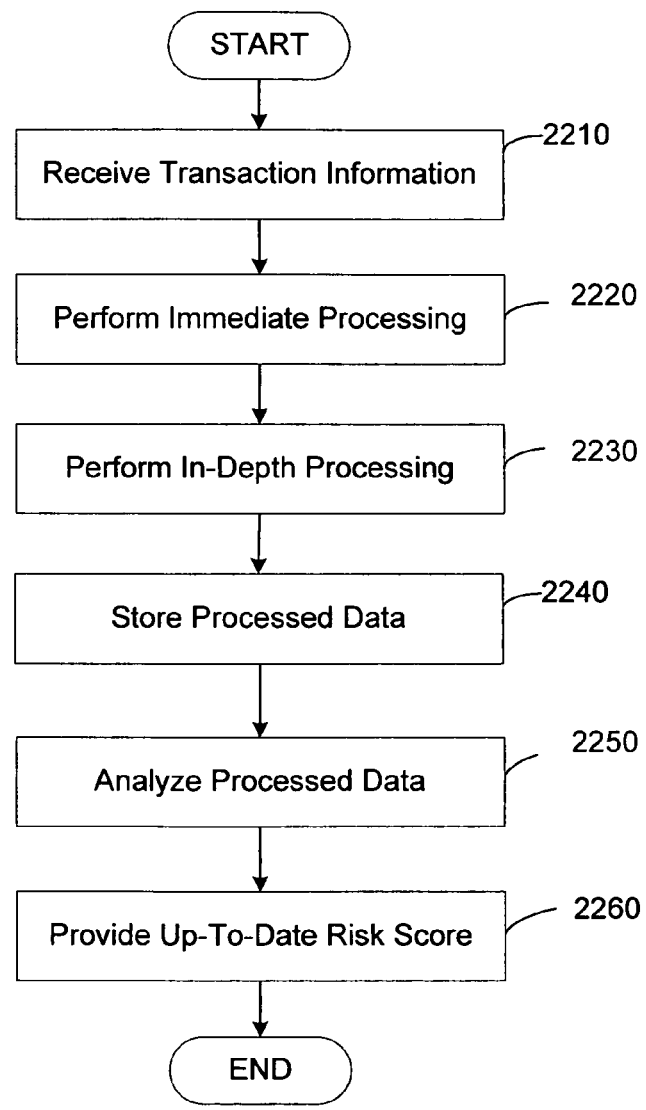
FIG. 22 shows an illustrative method for performing risk assessment, in accordance with some embodiments of systems and methods discussed herein.

FIG. 22 outlines an illustrative method that may be performed by a risk assessment system to determine a security risk associated with an electronic transaction. In act 2210, the risk assessment system may receive information regarding the electronic transaction. This information may be received from any suitable combination of sources, such as a third-party system for implementing identification tests, a publisher system, and/or a user system. Additionally, as discussed in greater detail below, any suitable combination of information may be received in act 2210 to enable the risk assessment system to take into account various aspects of the electronic transaction.

In act 2220, part or all of the information received in act 2210 may be processed immediately after act 2210. This may enable the risk assessment system to react to new information in a timely manner. Additionally, or alternatively, more in-depth processing may be performed in act 2230 on part or all of the information received in act 2210. The in-depth processing may take place some time after act 2210, for example, when sufficient processing resources become available.

In act 2240, processed data resulting from immediate processing (act 2220) and/or in-depth processing (act 2230)

may be stored in one or more data storage locations. For example, processed data may be stored in association with a user identifier, such as an IP address of a user. This may enable the risk assessment system to retrieve all available information regarding a user in determining a security risk associated with an electronic transaction involving the user.

In act 2250, some or all of the processed data may be retrieved and analyzed. This may occur on an on-going basis (e.g., periodically), and/or on a per-query basis (e.g., when the risk assessment system is requested to analyze a given electronic transaction). As a result of the analysis, a risk score may be provided and/or updated. In some embodiments, the risk score may be associated with a user and may indicate a level of trustworthiness of the user. Examples of various types of analysis that may be performed in act 2250 are described in greater detail below.

In act 2260, an up-to-date risk score may be provided to one or more different entities. For example, the risk score may be provided to a third-party system for implementing identification tests, which may use the risk score to determine a manner in which an identification test is implemented. As another example, the risk score may be provided to a publisher, which may use the risk score to determine an access privilege to be granted to a user. As with act 2250, act 2260 may occur on an on-going and/or per-query basis. Additionally, risk scores may be provided in a batched fashion. For example, multiple scores associated with multiple users may be provided all at once.

It should be appreciated that the risk assessment method outlined in FIG. 22 is merely illustrative, as other methods may also be suitable. Additionally, a risk assessment method, such as that outlined in FIG. 22, may be employed a number of different scenarios, some examples of which are discussed below.

In some embodiments, a risk assessment system may receive various logs and outputs from a third-party system that provides identification tests. The risk assessment system may examine one or more records of an identification test transaction to determine a user IP address associated with the identification test transaction. Additionally, the risk assessment system may determine whether the user passed or failed that identification test and use that information to update its assessment of whether the user IP address is likely to be associated with a human user or a bot.

The inventor has appreciated that many IP addresses may be shared by multiple users, and it may be relatively easy for an attacker to change IP addresses. Accordingly, in some embodiments, a risk assessment system may rely on past information to various degrees. For example, the risk assessment system may not simply blacklist or whitelist IP addresses. Rather, risk assessment may be performed on an on-going basis, based on both past and present information.

In some embodiments, a risk assessment system may receive and analyze identification test information in real time. That is, the risk assessment system may receive and analyze information as an identification test is being administered, rather than after the identification test has concluded. This may enable quick feedback of risk information (e.g., within minutes or seconds after new information becomes available). For example, a risk assessment result may be provided to a publisher as part of an identification test result, and may take into account information such as how much time a user took to submit an identification test result and/or how many times a user activated a refresh button to request a new challenge graphic.

In some embodiments, a risk assessment may be used by a plurality of publishers and may provide coordinated information updates. For example, if it is determined that one publisher is under attack, another publisher may be alerted so that the other publisher may perform security upgrades accordingly.

In some embodiments, a risk assessment system may provide risk information to a third-party system for providing identification tests at various stages of the implementation of an identification test. For example, risk information may be provided prior to or during generation of a token (e.g., act 1714 of FIG. 17). Additionally, or alternatively, risk information may be provided prior to or during validation of a user response (e.g., act 1760 of FIG. 17).

In some embodiments, a risk assessment system may be implemented in settings other than identification tests. For example, a risk assessment system may be used to evaluate a risk involved in a credit card transaction (e.g., to determine whether additional validation procedures are to be performed following an initial validation procedure). Additionally, a honeypot (e.g., a link or an email address placed on a webpage in such a way that it is visible to bots but not to humans) may be used to collect additional information for use by a risk assessment system. Alternatively, or additionally, a risk assessment system may be used to determine whether a honey pot (or other suitable security features) is to be implemented.

In some embodiments, a risk assessment system may take into account various information regarding an electronic transaction in evaluating a security risk associated with the electronic transaction. For example, a risk assessment system may take into account a location and/or purpose of the electronic transaction. For example, different types of electronic transactions such as random verification, account creation and information posting may have different characteristics and may trigger different methods of risk analysis. For example, registering for a large number of email accounts in a day may result in a different risk assessment than posting a large number of messages on a message board in a day. As another example, posting on a blog or message board may take longer than a random verification, because a user may need to compose a post prior to submitting a response.

As discussed above, a user may request that a correct response to an identification test be sent in a text message. In some embodiments, a risk assessment system may monitor text message requests for behaviors consistent with nefarious activity. For example, the risk-assessment system may monitor the frequency with which a text message is requested for a given phone number and take into account such information, in a risk assessment analysis.

In some embodiments, various pieces of information (e.g., current user information, user address history and/or other risk factors) may be combined by a risk assessment system using different relative weightings. The different relative weightings may change over time, and may be determined based on inputs from an entity external to the risk assessment system (e.g., a publisher).

In some embodiments, a publisher may use risk information provided by a risk assessment system to determine security measures to be taken with respect to a user. For example, a publisher may decide to deny a user's request to access one or more resources if the risk information indicate a high risk that the user is a bot, even if the user has correctly responded to an identification test. The denial may be temporary, and the user may be given the opportunity to complete another identification test after a predetermined amount of time. Alternatively, or additionally, a publisher may decide to impose more stringent security requirements on a high risk user, such as additional identification tests (e.g., at different difficulty levels) as the user traverses different portions of the publisher's web site. A publisher may even employ "silent" security measures, so that a high risk user is not aware that its access request has been effectively denied. For example, a publisher may allow a high risk user to open a new email account, but may silently filter out all outgoing emails sent from the newly opened account. This may prevent leakage of information to high risk users that may otherwise occur with direct denial of access.

In some embodiments, identification tests may be trackable. For example, each identification test administered may be associated with a unique identifying tag. The identifying tag may be created by a publisher for whom the identification test is administered. A risk assessment system may maintain a list of identifying tags for those identification tests in which a user provides a correct response but is later discovered to be a bot or a "human net" (i.e., a collection of humans incentivized to solve identification tests). This list of identifying tags may be returned to the publisher upon request, or on an ongoing (e.g., regular or irregular) basis, to enable the publisher to take any necessary corrective measures, such as suspending an account and/or redacting a posted comment.

In some embodiments, identification tests may be trackable using identifying tags that are recognizable by more than one publisher. For example, an IP address of a user to whom an identification test is administered may be used as an identifying tag. The risk assessment system may maintain a record associated with each identifying tag and may provide some or all of the information contained in the record to a publisher or any other suitable party. The record may contain any combination of information associated with each identifying tag, for example, identification test results associated with the identifying tag and/or information indicating a purpose for each administered identification test (e.g., account creation or posting a comment).

Figure 23:
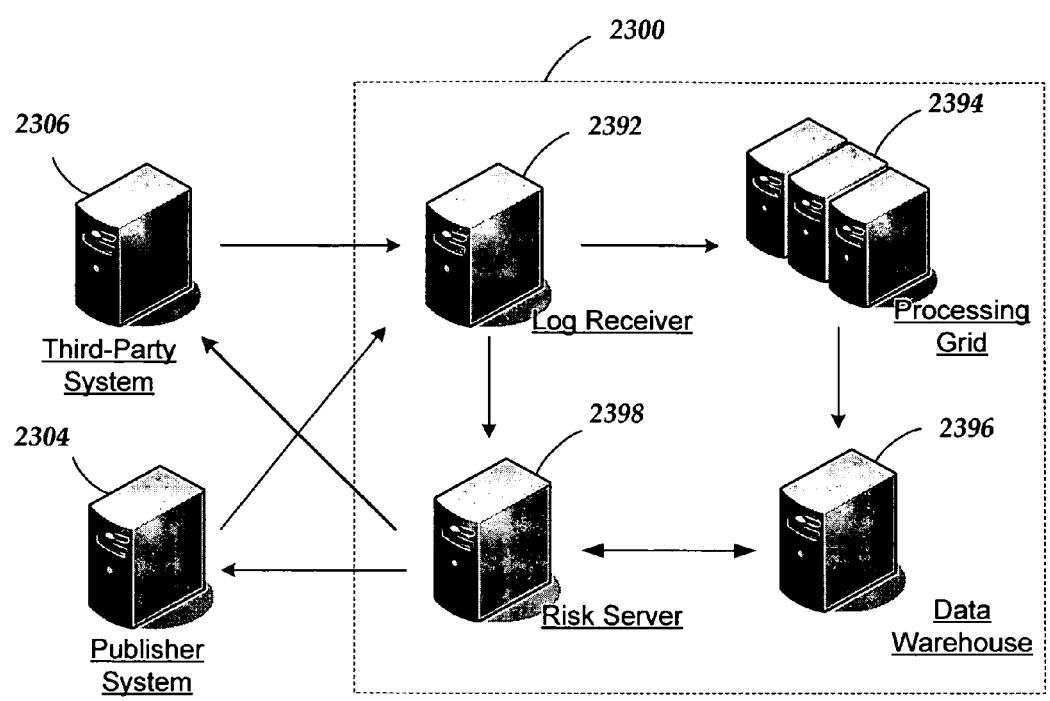
FIG. 23 illustrates an example of a risk assessment system comprising various components for performing various tasks in risk assessment, in accordance with some embodiments of systems and methods discussed herein.

FIG. 23 shows an illustrative implementation of a risk assessment system 2300, comprising a log receiver 2392, a processing grid 2394, a data warehouse 2396 and a risk server 2398. As shown in FIG. 23, the log receiver 2392 may receive log information regarding an electronic transaction from any suitable combination of sources, such as a third-party system 2306 for implementing identification tests and/or a publisher system 2304 (cf. act 2210 of FIG. 22). The log information may include information regarding an access request initiated by a user, an IP address of the user, information regarding a resource that the user is attempting to access, a response from the user during an identification test, and/or a characteristic of the user's response (e.g., how quickly the user returned the response). Other combinations of information may also be possible.

In some embodiments, the log receiver 2392 may distribute some or all of the received log information to the risk server 2398 for immediate processing (cf. act 2220 of FIG. 22). This information may be transmitted in near real time and at a relatively-high priority. Additionally, or alternatively, the log receiver 2392 may distribute some or all of the received log information to the processing grid 2394 for in-depth processing (cf. act 2230 of FIG. 22). The log information transmitted to the processing grid 2394 may include more detailed information than the information transmitted directly to the risk server 2398.

In some embodiments, the processing grid 2394 may be a conventional grid computer network that parses input logs from the log receiver 2392 and looks for patterns. Many different numbers and types of questions may be asked during a search for patterns. Additionally, the number and/or types of questions may evolve over time. Below is an illustrative list of questions, although other may also be possible.

1) What is the last known activity from a given address?
2) Is there a correlation between a geographic location and bot attacks?
3) Does time of day/week/month correlate to any bot-attack information?
4) Is there a correlation between given hosting providers and bot attacks?
5) Is there a correlation between a given network owner and bot attacks?
6) Is a response to an identification test correct? If so, how much time has elapsed before the user sends the response? If not, is the response a putative typo? For example, is an incorrect key located in proximity to a correct key on the keyboard?

Log information processed by the processing grid 2394 and/or the risk server 2398 may be stored in the data warehouse 2396 (cf. act 2240 of FIG. 22), and may be subsequently retrieved and analyzed by the risk server 2398 (cf. act 2250 of FIG. 22).

In some embodiments, the risk server 2398 may combine log information from the log receiver 2392 with any previously-obtained and processed information associated with a user address of a user stored in the data warehouse 2396. The combined information may be used to update a risk assessment associated with the user address. The risk server 2398 may then provide the up-to-date risk assessment to the publisher system 2304 and/or the third-party system 2306 (cf. act 2260 of FIG. 22).

Many different criteria and/or techniques may be used in updating a risk assessment. For example, a current risk assessment may be computed as a series of events over time, taking into account an assumption that risk may change according to recent behavior and may not be simply a static view of history (e.g., many users may have dynamic addresses). As another example, an understanding of forwarded data and proxy servers may be needed, such as understanding how America Online® accesses the Internet using proxy servers. Furthermore, attacks or probes from bots may need to be detected quickly, while incorrect responses from legitimate users (i.e., false positive errors) may need to be detected but not penalized heavily. Also, to reduce the likelihood of false positive errors, a user may not be categorized as high risk simply based on a small number of incorrect responses. Additional evidence may be required to make such a categorization, such as the total number of responses submitted within a given time period and/or the time of day at which the responses are submitted, or the distribution or amount of time between responses (e.g., responses in sequence faster than a typical human can act suggest responses from a bot).

Figure 24:
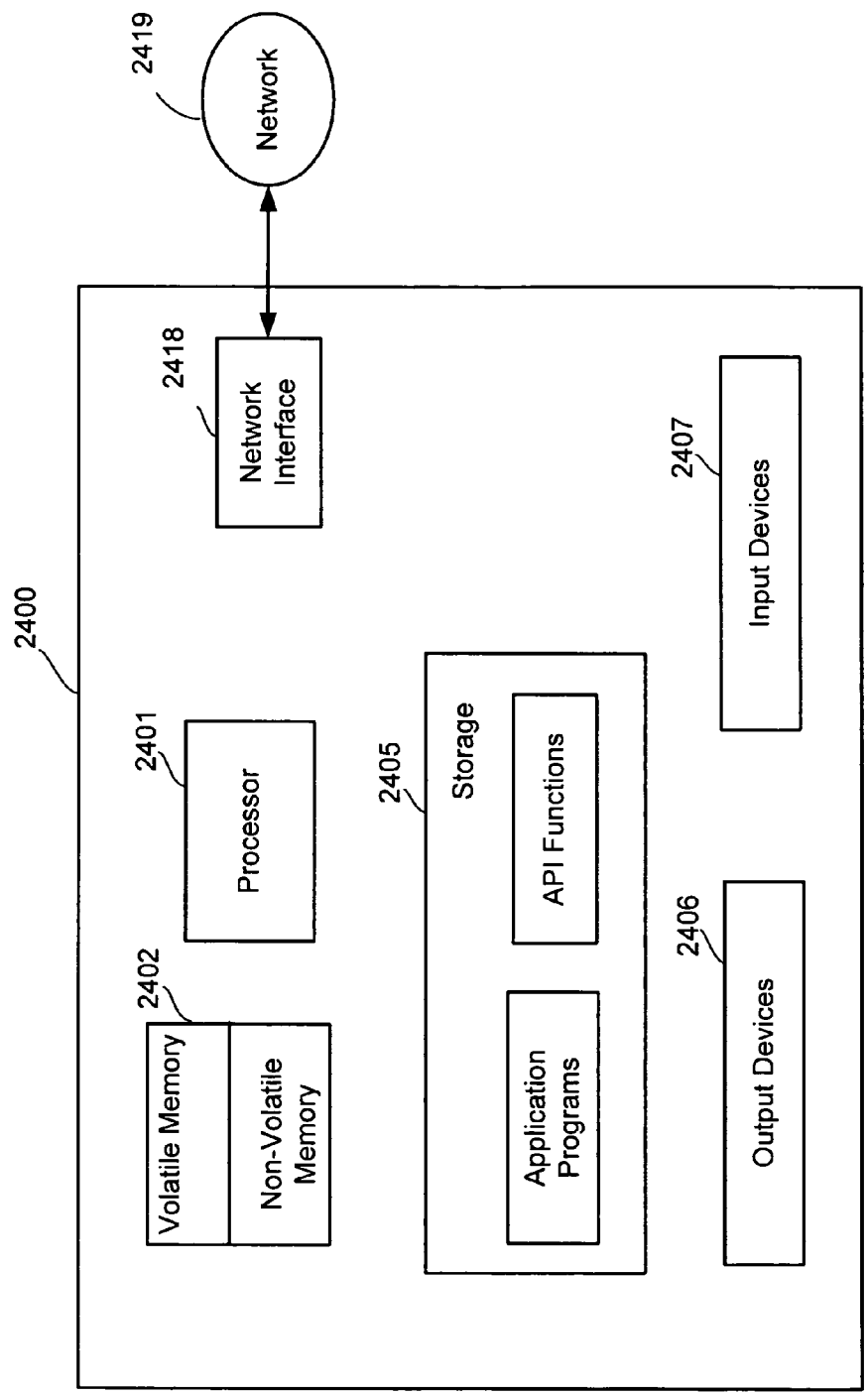
FIG. 24 is a schematic illustration of an exemplary computer or computer system on which various aspects of the disclosed methods and systems may be implemented.

Various inventive aspects described herein may be used with any computer or device having a processor that may be programmed to take any of the actions described above. FIG. 24 is a schematic illustration of an exemplary computer 2400 on which various inventive aspects may be implemented. The computer 2400 includes a processor or processing unit 2401 and a memory 2402 that may include volatile and/or non-volatile memory. The computer 2400 also includes storage 2405 (e.g., one or more disk drives) in addition to the system memory 2402. The memory 2402 may store one or more instructions to program the processing unit 2401 to perform any of the functions described herein. As mentioned above, the reference herein to a computer may include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The computer may have one or more input and output devices, such as devices 2406 and 2407 illustrated in FIG. 24. These devices may be used, among other things, to present a user interface. Examples of output devices that may be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Computer 2400 may also comprise one or more network interface cards (e.g., 2418) to enable communication via one or more networks (e.g., 2419). Examples of networks include a local area network or a wide area network, such as an enterprise network or the Internet. Such networks may be based on any suitable technology and may operate according to any suitable protocol and may include wireless networks, wired networks or fiber optic networks.

The above-described embodiments may be implemented in any of numerous ways. For example, the embodiments may be implemented using hardware, software or a combination thereof. When implemented in software, the software code may be executed on any suitable processor or collection of processors, whether provided in a single computer or distributed in a modular fashion among a number of different computers or processors.

Also, the various methods or processes outlined herein may be coded as software that is executable on one or more processors that employ any one of a variety of operating systems or platforms. Additionally, such software may be written using any number of suitable programming languages and/or programming or scripting tools, and also may be compiled as executable machine language code or intermediate code that is executed on a framework or virtual machine.

In this respect, various inventive aspects may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be transportable, such that the program or programs stored thereon may be loaded onto one or more different computers or other processors to implement various inventive aspects as discussed above.

The terms "program" or "software" are used herein in a generic sense to refer to any type of computer code or set of computer-executable instructions that may be employed to program a computer or other processor to implement various inventive aspects as discussed above. Computer-executable instructions may be in many forms, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the invention may be embodied as a method, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. The phrases "or" and "and/or" should be understood to mean "either or both" of the elements so conjoined, i.e., the elements that are conjunctively present in some cases and disjunctively present in other cases.

Having thus described several inventive aspects of at least some embodiments, it is to be appreciated that various alterations, modifications, and improvements will readily occur to those skilled in the art. Such alterations, modifications and improvements are intended to be within the spirit and scope of the present disclosure. Accordingly, the foregoing description and drawings are by way of example only.

What is claimed is:

1. A system for assessing security risk, the system comprising at least one processor programmed to:
   maintain a plurality of records, wherein:
      each record is associated with a respective network address in a plurality of network addresses; and
      each record comprises information regarding user behaviors observed from a plurality of previous electronic transactions that have been tagged with the network address associated with the record;
   receive log information regarding a present electronic transaction;
   use the log information to determine at least one network address from which the present electronic transaction is requested; and
   analyze the log information regarding the present electronic transaction in combination with history information associated with the at least one network address, wherein the history information is based on the record associated with the at least one network address and is indicative of at least one user behavior observed from the plurality of previous electronic transactions that have been tagged with the at least one network address; and while the present electronic transaction is still on-going, provide an updated risk assessment for the at least one network address based on a result of analyzing the log information regarding the present electronic transaction in combination with the history information associated with the at least one network address.

2. The system of claim 1, wherein the at least one processor is further programmed to:
in providing the updated risk assessment, take into account current user information indicative of at least one user behavior observed in connection with the present electronic transaction.

3. The system of claim 1, wherein the at least one processor is further programmed to:
determine, based on the updated risk assessment, whether the present electronic transaction is likely to be associated with an attack at a first publisher; and
upon detecting an attack at the first publisher, notify a second publisher of the attack.

4. The system of claim 1, wherein the at least one processor is further programmed to:
analyze network traffic associated with the present electronic transaction to determine data forwarding information indicative of whether data is forwarded by a proxy server; and
in providing the updated risk assessment, take into account the data forwarding information.

5. The system of claim 1, wherein the at least one processor is further programmed to:
determine a geographical location associated with the present electronic transaction;
in providing the updated risk assessment, take into account the geographical location.

6. The system of claim 1, wherein the at least one processor is further programmed to:
determine a time of day, week, or month associated with the present electronic transaction;
in providing the updated risk assessment, take into account the time of day, week, or month.

7. The system of claim 1, wherein the at least one processor is further programmed to:
determine a hosting provider associated with the present electronic transaction;
in providing the updated risk assessment, take into account the hosting provider.

8. The system of claim 1, wherein the at least one processor is further programmed to:
determine a network owner associated with the present electronic transaction;
in providing the updated risk assessment, take into account the network owner.

9. The system of claim 1, wherein, in analyzing the log information regarding the present electronic transaction in combination with history information associated with the at least one network address, the at least one processor is programmed to apply a first weighting to the log information regarding the present electronic transaction, and a second weighting to the history information associated with the at least one network address, the second weighting being different from the first weighting.

10. The system of claim 1, wherein the log information regarding the present electronic transaction comprises an indication of an amount of time taken by a user to perform an action in connection with the present electronic transaction.

11. A method for assessing security risk, the method comprising acts of:
maintaining a plurality of records, wherein:
each record is associated with a respective network address in a plurality of network addresses; and
each record comprises information regarding user behaviors observed from a plurality of previous electronic transactions that have been tagged with the network address associated with the record;
receiving log information regarding a present electronic transaction;
using the log information to determine at least one network address from which the present electronic transaction is requested; and
analyzing the log information regarding the present electronic transaction in combination with history information associated with the at least one network address, wherein the history information is based on the record associated with the at least one network address and is indicative of at least one user behavior observed from the plurality of previous electronic transactions that have been tagged with the at least one network address; and
while the present electronic transaction is still on-going, providing an updated risk assessment for the at least one network address based on a result of analyzing the log information regarding the present electronic transaction in combination with the history information associated with the at least one network address.

12. The method of claim 11, wherein current user information indicative of at least one user behavior observed in connection with the present electronic transaction is taken into account in the act of providing the updated risk assessment.

13. The method of claim 11, further comprising acts of:
determining, based on the updated risk assessment, whether the present electronic transaction is likely to be associated with an attack at a first publisher; and
upon detecting an attack at the first publisher, notifying a second publisher of the attack.

14. The method of claim 11, further comprising an act of:
analyzing network traffic associated with the present electronic transaction to determine data forwarding information indicative of whether data is forwarded by a proxy server, wherein the data forwarding information is taken into account in the act of providing the updated risk assessment.

15. The method of claim 11, further comprising an act of:
determining a geographical location associated with the present electronic transaction, wherein the geographical location is taken into account in the act of providing the updated risk assessment.

16. The method of claim 11, further comprising an act of:
determining a time of day, week, or month associated with the present electronic transaction, wherein the day, week, or month is taken into account in the act of providing the updated risk assessment.

17. The method of claim 11, further comprising an act of:
determining a hosting provider associated with the present electronic transaction, wherein the hosting provider is taken into account in the act of providing the updated risk assessment.

18. The method of claim 11, further comprising an act of:
determining a network owner associated with the present electronic transaction, wherein the network owner is taken into account in the act of providing the updated risk assessment.

19. The method of claim 11, wherein the act of analyzing the log information regarding the present electronic transaction in combination with history information associated with the at least one network address comprises:
applying a first weighting to the log information regarding the present electronic transaction, and a second weighting to the history information associated with the at least one network address, the second weighting being different from the first weighting.

20. The method of claim 11, wherein the log information regarding the present electronic transaction comprises an indication of an amount of time taken by a user to perform an action in connection with the present electronic transaction.

21. At least one non-transitory computer-readable medium encoded with a plurality of instructions that, when executed by at least one processor, perform a method for assessing security risk, the method comprising acts of:
maintaining a plurality of records, wherein:
each record is associated with a respective network address in a plurality of network addresses; and
each record comprises information regarding user behaviors observed from a plurality of previous electronic transactions that have been tagged with the network address associated with the record;
receiving log information regarding a present electronic transaction;
using the log information to determine at least one network address from which the present electronic transaction is requested; and
analyzing the log information regarding the present electronic transaction in combination with history information associated with the at least one network address, wherein the history information is based on the record associated with the at least one network address and is indicative of at least one user behavior observed from the plurality of previous electronic transactions that have been tagged with the at least one network address; and
while the present electronic transaction is still on-going, providing an updated risk assessment for the at least one network address based on a result of analyzing the log information regarding the present electronic transaction in combination with the history information associated with the at least one network address.

* * * * *